(12) United States Patent
Scheer

(10) Patent No.: US 7,822,927 B1
(45) Date of Patent: Oct. 26, 2010

(54) DYNAMICALLY CONFIGURABLE REVERSE DNLC LOOKUP

(75) Inventor: Michael D. Scheer, Summit, NJ (US)

(73) Assignee: EMC Corporation, Hopkinton, MA (US)

( * ) Notice: Subject to any disclaimer, the term of this patent is extended or adjusted under 35 U.S.C. 154(b) by 467 days.

(21) Appl. No.: 11/748,457

(22) Filed: May 14, 2007

(51) Int. Cl.
G06F 17/30 (2006.01)
G06F 12/08 (2006.01)

(52) U.S. Cl. .................. 711/133; 711/216; 707/829
(58) Field of Classification Search .................. 711/205, 711/216
See application file for complete search history.

(56) References Cited

U.S. PATENT DOCUMENTS

| | | | | |
|---|---|---|---|---|
| 4,715,045 A | * | 12/1987 | Lewis et al. ................. | 375/285 |
| 5,339,427 A | * | 8/1994 | Elko et al. .................. | 718/103 |
| 5,893,140 A | | 4/1999 | Vahalia et al. | |
| 6,047,283 A | * | 4/2000 | Braun ........................... | 707/3 |
| 6,324,581 B1 | | 11/2001 | Xu et al. | |
| 6,578,131 B1 | * | 6/2003 | Larson et al. ............... | 711/216 |
| 6,618,792 B1 | * | 9/2003 | Perrin et al. ................ | 711/122 |
| 6,718,372 B1 | * | 4/2004 | Bober ......................... | 709/217 |
| 6,768,739 B1 | * | 7/2004 | Kobayashi et al. .......... | 370/392 |
| 7,103,616 B1 | * | 9/2006 | Harmer et al. .............. | 707/201 |
| 7,228,299 B1 | * | 6/2007 | Harmer et al. ................ | 707/3 |
| 7,272,654 B1 | * | 9/2007 | Brendel ....................... | 709/229 |
| 2002/0191792 A1 | * | 12/2002 | Anand ........................ | 380/255 |
| 2004/0003148 A1 | * | 1/2004 | Ali-Santosa et al. ......... | 710/52 |
| 2004/0117600 A1 | * | 6/2004 | Bodas et al. ................. | 712/210 |
| 2004/0252902 A1 | * | 12/2004 | Vienneau .................... | 382/240 |
| 2004/0267745 A1 | * | 12/2004 | HoogerBrugge et al. ....... | 707/8 |
| 2005/0273570 A1 | * | 12/2005 | DeSouter et al. ............ | 711/203 |
| 2006/0212496 A1 | * | 9/2006 | Romine et al. .............. | 707/204 |
| 2006/0271598 A1 | * | 11/2006 | Wong et al. ................. | 707/200 |
| 2007/0088702 A1 | | 4/2007 | Fridella et al. | |
| 2008/0046445 A1 | * | 2/2008 | Passey et al. ................ | 707/100 |

OTHER PUBLICATIONS

Uresh Vahalia, Unix Internals: The New Frontiers, Chapter 9, "File System Implementations," 1996, p. 261-289, Prentice-Hall, Inc., Upper Saddle River, NJ.

Bill Nowicki, Network Working Group, RFC 1094, "Network File System Protocol Specification," Mar. 1989, 27 pages Sun Microsystems, Inc., Santa Clara, CA.

(Continued)

Primary Examiner—Brian R Peugh
Assistant Examiner—Nicholas Simonetti
(74) Attorney, Agent, or Firm—Richard Auchterlonie; Novak Druce & Quigg, LLP

(57) ABSTRACT

A directory name lookup cache (DNLC) provides a hashed forward mapping for finding the "child handle" associated with a "parent handle" and a "child name." To provide an efficient reverse lookup capability, a second set of links is added to each cache entry for a "child hash list" indexed by a hashing of the child handle. For dynamically enabling and disabling the reverse mapping, when a new cache entry is added to its parent hash list, if the reverse mapping is enabled, then the new cache entry is also added to its child hash list; otherwise, the new cache entry is marked to indicate that it is not in any child hash list. To save memory, the parent hash lists and the child hash lists may share hash buckets.

17 Claims, 19 Drawing Sheets

OTHER PUBLICATIONS dnlc.c, OpenSolaris Source Code, FreeBSD, "watson.org", Sun Microsystems, Inc., Santa Clara, CA, printed Mar. 9, 2007, .34 pages.

dnlc.c, OpenSolaris Source Code, "opensolaris.org", printed Mar. 9, 2007, 32 pages, Sun Microsystems, Inc., Santa Clara, CA.

DNLC Improvements, Solaris 8 System Administration Supplement, "docs.sun.com," 2006, 3 pages, Sun Microsystems, Inc., Santa Clara, CA.

HP-UX 11i Release Notes, HP 9000 computers, 2000, pp. 1-2 and 249-252, Hewlett-Packard Co., Palo Alto, CA.

PSTAT Interfaces, Whitepaper, "hp.com." May 2000, 44 pages, Hewlett-Packard Co., Palo Alto, CA.

Eric Schrock, Reflections on OS Addiction, Eric Schrock's Weblog, "blogs.sun.com", Jul. 12, 2004, 3 pages, Sun Microsystems, Inc., Santa Clara, CA.

Paul L. Leach and Dilip C. Naik, "A Common Internet File System," Microsoft Corporation, Redmond, WA, Dec. 19, 1997, 121 pages.

* cited by examiner

DYNAMICALLY CONFIGURABLE REVERSE DNLC LOOKUP

FIELD OF THE INVENTION

The present invention relates generally to computer data storage, and more particularly to file servers. The present invention specifically relates to a Directory Name Lookup Cache (DNLC) having a hashed reverse mapping that can be dynamically enabled and disabled without substantial disruption to the hashed forward mapping normally used for the lookup of file or subdirectory names in a file system directory.

BACKGROUND OF THE INVENTION

For convenient reference to stored computer data, the computer data is typically contained in one or more files. Each file has a logical address space for addressing the computer data in the file. Each file also has attributes including an alphanumeric name for identifying the file. In a typical general purpose digital computer or in a file server, an operating system program called a file system manager assigns each file a unique numeric identifier called a "file handle," and also maps the logical address space of the file to a storage address space of at least one data storage device such as a disk drive.

Typically a human user or an application program accesses the computer data in a file by requesting the file system manager to locate the file. After the file system manager returns an acknowledgement that the file has been located, the user or application program sends requests to the file system manager for reading data from or writing data to specified logical addresses of the file.

Typically the user or application program specifies an alphanumeric name for the file to be accessed. The file system manager searches one or more directories for the specified name of the file. A directory is a special kind of file. The directory includes an alphanumeric name and an associated file handle for each file in the directory. Once the file system manager finds the specified name in the directory, it may use the file handle associated with the specified name for reading or writing data to the file.

For referencing a large number of files, the files typically are grouped together in a file system including a hierarchy of directories. Each file is specified by a unique alphanumeric pathname through the hierarchy. The pathname includes the name of each directory along a path from the top of the hierarchy down to the directory that includes the file. To locate the file, the user or application program specifies the pathname for the file, and the file system manager searches down through the directory hierarchy until finding the file handle. Because this search may require multiple directories to be scanned along the path through the hierarchy, the search may require considerable time. Therefore, techniques have been devised for avoiding or accelerating this search process.

So that a search through the directory hierarchy is performed no more than once each time that a user or application program opens a file, the file system manager may return the file handle to the user or application program with an acknowledgement that the file has been located. The user or application program includes the file handle in subsequent requests to read or write data to the file.

So that a search through the directory hierarchy need not be performed each time that a user or application program opens a file, the file system manager may also store the name of the file and its associated file handle in a random access cache memory called a Directory Name Lookup Cache (DNLC). Typically the DNLC includes a hash table index of pointers to hash lists of cache entries. Each hash list entry includes a directory handle, a subdirectory or file handle, the alphanumeric name of the subdirectory or file, and a set of hash list pointers. For retaining frequently accessed hash list entries in the random access memory, the DNLC also maintains a least recently used (LRU) list for identifying a DNLC cache block to be used when a new entry is to be added to a hash list.

In operation, a DNLC manager is requested to search the DNLC in order to find the handle of a subdirectory or file having a specified alphanumeric name in a directory having a specified handle. The DNLC manager computes a hashing of the specified directory handle and the specified alphanumeric name, and indexes the hash table. Then the DNLC manager searches the hash list pointed to by the indexed hash table row. If the DNLC manager finds a cache entry having the specified directory handle and specified alphanumeric name, then the DNLC manager returns the subdirectory or file handle found in the cache entry. Otherwise, if the hash list is empty or has no entry with a matching directory handle and a matching alphanumeric name, then the DNLC manager returns an indication that such a named subdirectory or file was not found in the specified directory.

Occasionally a reverse lookup is desired to find the pathname for a given file handle. For example, a file server log may report that an error occurred when processing a request from a user or application program for reading or writing to a specified file handle. For diagnosing this error, a system analyst would like to know the pathname of the file being accessed, since the pathname might be found in the application program code that attempted to access the file, or the pathname might be more convenient for inspection of the file and related files. A reverse lookup may also be used to report statistics about accesses to open files in terms of the file pathnames from a collection of the information based on a log of read-write accesses to specified file handles.

The DNLC has been provided with a reverse lookup that sequentially searches the hash lists for a DNLC cache entry having a specified file handle. For example, such a DNLC reverse lookup function is found in lines 904-944 of the OpenSolaris DNLC source code published on the Internet at 'opensolaris.org" by Sun Microsystems (2006). This is a highly inefficient function, since the DNLC is constructed solely for efficient forward lookups.

SUMMARY OF THE INVENTION

In accordance with one aspect, the invention provides a method of operation of a data processing system. The data processing system includes an electronic random access memory and at least one data processor coupled to the random access memory for writing data to and reading data from the random access memory. The method includes storing cache entries in the random access memory. Each of the cache entries includes a parent handle, a child handle, and an alphanumeric child name. The parent handle is a handle of a directory in a file system, the child handle is a handle of a subdirectory or file in the directory, and the child name is a name of the subdirectory or file. The method also includes preempting cache entries that are not frequently accessed for storing new cache entries in the random access memory. The method also includes maintaining parent hash lists of the cache entries and searching the random access memory for a child handle associated with a specified parent handle and a specified child name by searching a parent hash list indexed by a hashing of the specified parent handle and the specified child name. The method further includes maintaining child hash lists of the cache entries and searching the random access memory for a parent handle and a child name associated with a specified child handle by searching a child hash list indexed by a hashing of the specified child handle.

In accordance with another aspect, the invention provides a data processing system. The data processing system includes an electronic random access memory, and at least one data processor coupled to the random access memory for writing data to and reading data from the random access memory. The at least one data processor is programmed for storing cache entries in the random access memory. Each of the cache entries includes a parent handle, a child handle, and an alphanumeric child name. The parent handle is a handle of a directory in a file system, the child handle is a handle of a subdirectory or file in the directory, and the child name is a name of the subdirectory or file. The at least one data processor is also programmed for preempting cache entries that are not frequently accessed for storing new cache entries in the random access memory. The at least one data processor is also programmed for maintaining parent hash lists of the cache entries and searching the random access memory for a child handle associated with a specified parent handle and a specified child name by searching a parent hash list indexed by a hashing of the specified parent handle and the specified child name. The at least one data processor is further programmed for maintaining child hash lists of the cache entries and searching the random access memory for a parent handle and a child name associated with a specified child handle by searching a child hash list indexed by a hashing of the specified child handle.

In accordance with yet another aspect, the invention provides a file server. The file server includes data storage for storing a file system, electronic random access memory, and at least one data processor coupled to the data storage for providing a client with access to the file system, and coupled to the random access memory for writing data to and reading data from the random access memory. The at least one data processor is programmed for storing cache entries in the random access memory. Each of the cache entries includes a parent handle, a child handle, and an alphanumeric child name. The parent handle is the handle of a directory in the file system, the child handle is the handle of a subdirectory or file in the directory, and the child name is a name of the subdirectory or file. The at least one data processor is also programmed for preempting cache entries that are not frequently accessed for storing new cache entries in the random access memory. The at least one data processor is also programmed for maintaining parent hash lists of the cache entries and searching the random access memory for a child handle associated with a specified parent handle and a specified child name by searching a parent hash list indexed by a hashing of the specified parent handle and the specified child name. The at least one data processor is also programmed for maintaining child hash lists of the cache entries and searching the random access memory for a parent handle and a child name associated with a specified child handle by searching a child hash list indexed by a hashing of the specified child handle. The at least one data processor is also programmed for responding to a request from the client for finding a file having a specified name in the file system by performing a forward lookup in the random access memory for a file handle of the file having the specified name and returning the file handle to the client. The at least one data processor is also programmed for responding to a request from the client for reading data from a file having a specified file handle by detecting an error upon finding that the file having the specified file handle is inaccessible from the data storage. The at least one data processor is further programmed for performing a reverse lookup in the random access memory to determine a pathname in the file system for the file having the specified file handle for recovery from the error.

BRIEF DESCRIPTION OF THE DRAWINGS

Additional features and advantages of the invention will be described below with reference to the drawings, in which.

Figure 1:
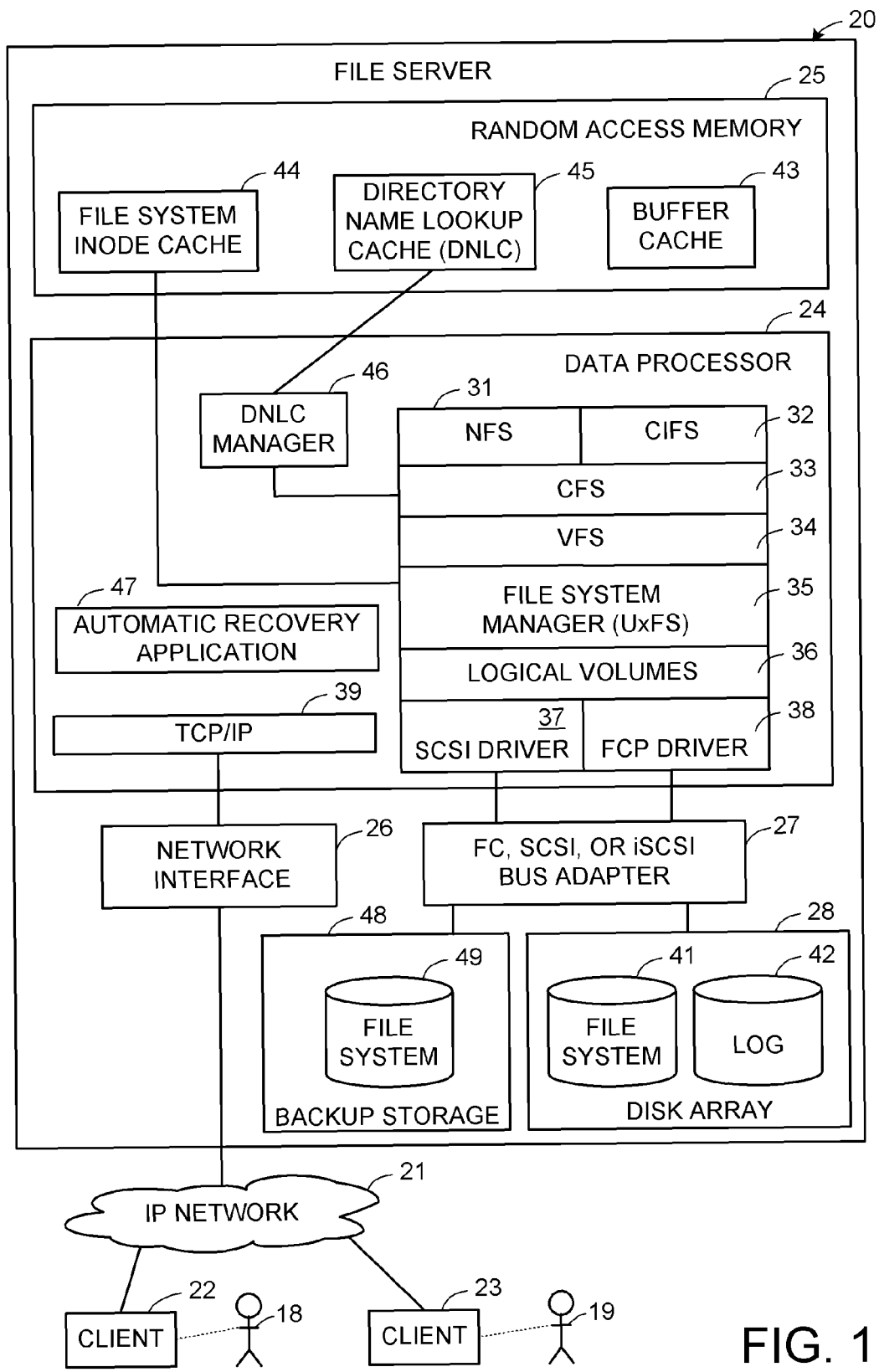
FIG. 1 is a block diagram of a data processing system including the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown an Internet Protocol (IP) data network 21 linking a file server 20 to clients 22, 23. The clients, 22, 23, for example, are workstations operated by human users 18, 19.

The file server 20 includes at least one data processor 24, random access memory 25, and a disk storage array 28. A network interface 26 provides an IP port for the data processor 24. A Fibre Channel (FC), Small Computer System Interface (SCSI), or Internet Small Computer System Interface (iSCSI) bus adapter 27 links the disk storage array 28 to the data processor 24. The data processor 24, random access memory 25, bus adapter 27, and network interface 26, for example, comprise a high-end commodity computer.

The data processor 24 is programmed with a protocol stack including a Network File System (NFS) protocol module 31 and a Common Internet File System (CIFS) protocol module 32 for providing the clients 22, 23 with file access protocols over the IP network 21. Data packets from the clients 22, 23, are received at the network interface 26, and transferred by a TCP/IP module 39 to buffer cache 43. The NFS module 31 or the CIFS module 32 recognizes file access requests in the data packets. Data to be read from or written to a file is also streamed through the buffer cache 43 between the network interface 26 and the bus adapter 27.

The NFS module 31 and the CIFS module 32 are layered over a Common File System (CFS) module 33. The CFS module 32 is layered over a Virtual File System (VFS) module 34. The VFS module 34 is layered over a UNIX®-based File System (UxFS) module 35.

The UxFS module 35 is a file system manager for managing a UNIX®-based file system 41 in storage of the disk array 28. Management of a UNIX®-based file system is described in Uresh Vahalia, *Unix Internals: The New Frontiers*, Chapter 9, "File System Implementations," Prentice-Hall, Inc., New Jersey, 1996, p. 261-289. The UxFS module 35 maintains a file system inode cache 44 in the random access memory 25, and logs file system metadata transactions to a file system log 42 in the disk array 28.

The UxFS module 35 accesses data organized into logical volumes defined by a logical volume layer module 36. Each logical volume maps to storage addresses in the disk array 28. The data processor 24 sends storage access requests to the disk array 28 through the bus adapter 27 using the FC, SCSI, or iSCSI protocol.

Further details regarding the construction of a network file server are found in Vahalia et al., U.S. Pat. No. 5,893,140 issued Apr. 6, 1999, incorporated herein by reference, and Xu et al., U.S. Pat. No. 6,324,581, issued Nov. 27, 2001, incorporated herein by reference.

For supporting NFS file access, the CFS module 33 accesses a cache 45 of directory pathname components. This cache 45 is called the directory name lookup cache (DNLC). The DNLC 45 is managed by a DNLC manager 46. The DNLC manager 46 does file system pathname to file handle translation. Each DNLC cache entry contains an alphanumeric name of a directory or file, and a file handle reference to the directory or file in the inode cache 44. If there is a cache miss upon lookup in the DNLC 45, then the DNLC manager 46 must read directory entries from the file system inode cache 44 or the file system 41 on disk and scan the directory entries to find the named directory or file.

In accordance with an aspect of the present invention, the DNLC 45 and the DNLC manager 46 are provided with a reverse lookup capability for performing a file handle to file system pathname translation. This reverse lookup capability permits an automatic recovery application 47 to recover from an error when a client 22 or 23 requests read or write access to a file specified by a file handle, and the file server 20 detects an error upon finding that the file in the file system is inaccessible in the disk array 28. The DNLC manager 46 performs a reverse translation of the file handle to obtain a pathname used by an automatic recovery application 47 to recover from the error by accessing a backup copy of the file in a file system 49 in backup storage 48. The reverse translation process and automatic recovery process are further described below with reference to FIGS. 20 and 21.

Figure 2:
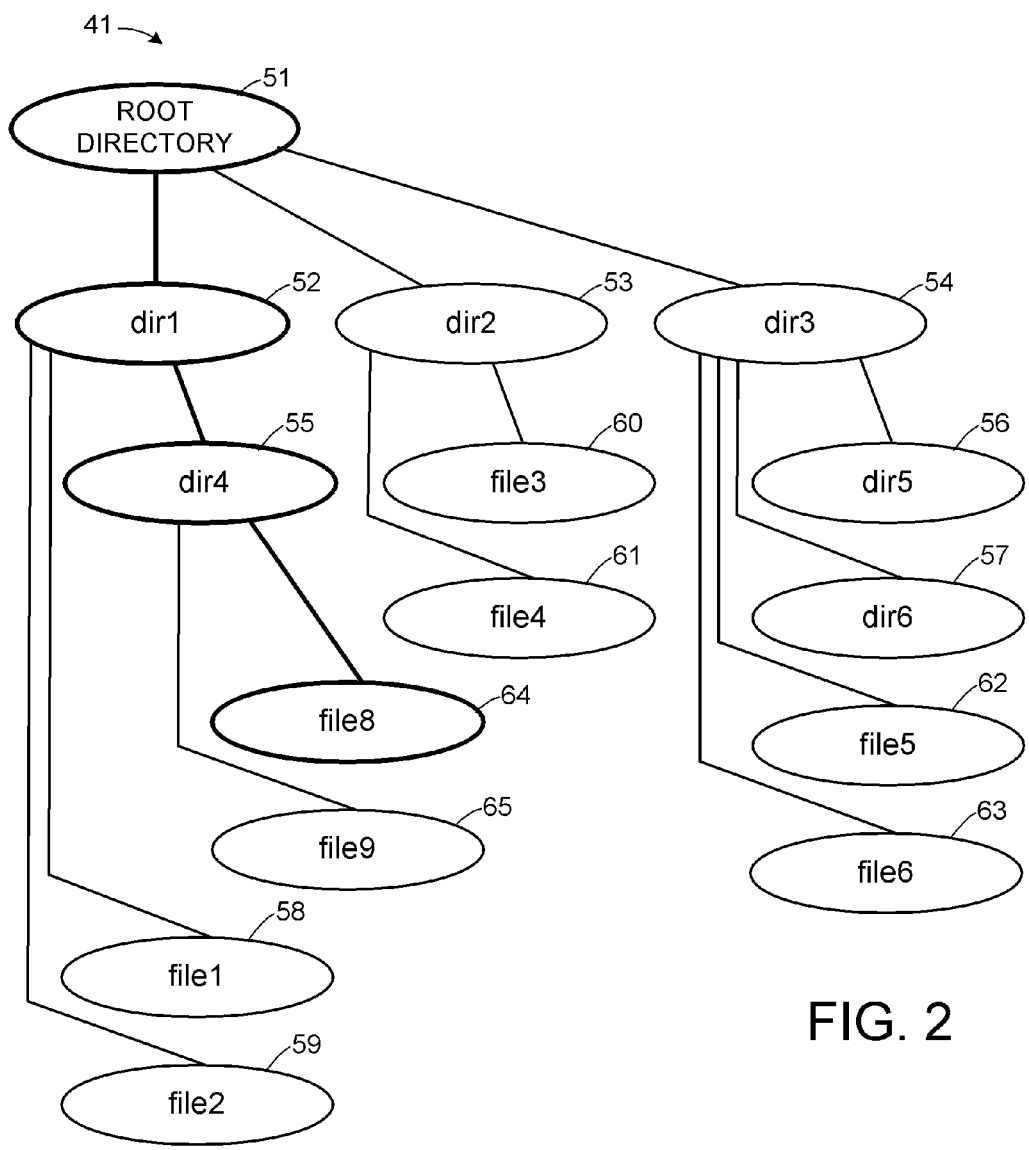
FIG. 2 is a block diagram of a file system having a hierarchy of directories.

FIG. 2 shows a pathname lookup in the UNIX®-based file system 41. The file system 41 includes a root directory 51 at the top of the hierarchy, and subdirectories 52, 53, and 54 descending from the root directory 51. A subdirectory 55 and files 58, 59 descend from the subdirectory 52. Files 60 and 61 descend from the subdirectory 53. Subdirectories 56, 57 and files 62 and 63 descend from the subdirectory 54.

In order to open a file in the file system, a user or application program of a client may provide a pathname of the file in the file system. For example, in order to open the file 64, a user provides the pathname "/dir1/dir4/file8". In this case, using the NFS protocol, the user's client sends a series of directory lookup requests to the file server in order to locate a handle for the file 64. A distinct directory lookup request is sent for each component of the pathname. For example, assuming that the client has a handle for the root directory 51, the first directory lookup request is a request for the handle of the subdirectory 52 named "dir1" in the root directory 51. A second directory lookup request is a request for the handle of the subdirectory 55 named "dir4" in the subdirectory 52. A third directory lookup request is a request for the handle of the file 64 named "file8" in the subdirectory 55. For each directory lookup request, the NFS module (31 in FIG. 1) requests the CFS module (33 in FIG. 1) to find the "child handle" of the subdirectory or file having a specified name in a directory having a specified "parent handle." The CFS module performs the search for each directory lookup request by invoking a "findChildHandle" function of the DNLC manager (46 in FIG. 1).

In response to the first directory lookup request, the DNLC manager (46 in FIG. 1) finds a file handle for the subdirectory named "dir1" in the root directory 51. If directory information for such a subdirectory cannot be found in the DNLC, then the DNLC manager accesses the file system Mode cache (44 in FIG. 1). If the root directory is not found in the file system Mode cache, then the root directory is read from the file system (41 in FIG. 1) on disk and written into the Mode cache. Then the DNLC manager scans the root directory in the Mode cache and finds a file handle for the subdirectory 52 named "dir1". This information is loaded into the DNLC cache, and returned to the CFS layer. The CFS layer returns the information to the NFS layer, and the NFS layer returns the information to the client.

In a similar fashion, the DNLC manager uses the file handle for the subdirectory 52 and the name "dir4" to access the DNLC to find a file handle for the subdirectory 55 named "dir4" in the subdirectory 52. Then the DNLC manager uses the file handle for the subdirectory 55 and the name "file8" to access the DNLC to find a file handle for the file 64 named "file8" in the subdirectory 55.

The DNLC manager returns the file handle for the file 64 to the CFS layer, and the CFS layer returns the file handle for the file 64 to the NFS module. The NFS module returns the file handle to the client, and the client uses the file handle in subsequent requests to read data from or write data to the file 64.

Figure 3:
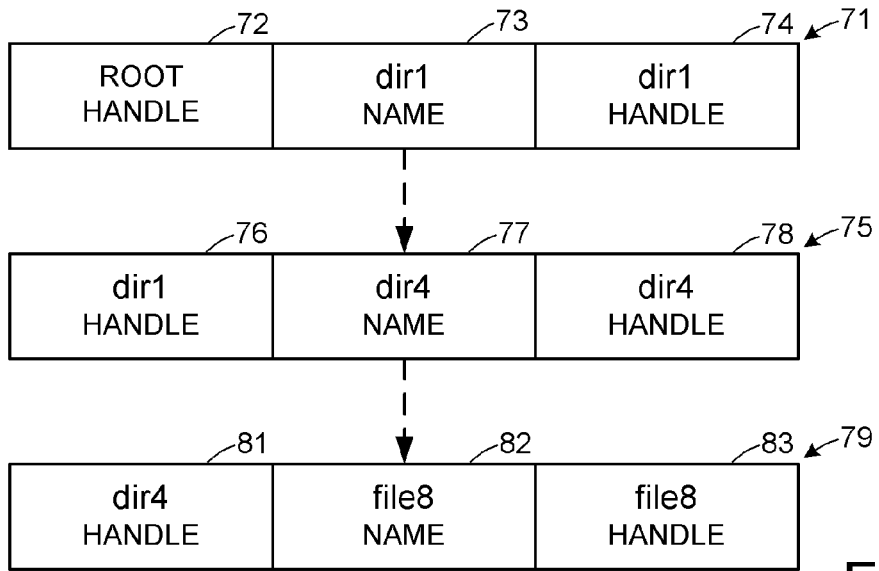
FIG. 3 is a block diagram of directory information accessed or cached during a pathname lookup in the directory hierarchy of FIG. 2

FIG. 3 shows directory information that is accessed or cached in the DNLC during the pathname lookup of FIG. 2. A first DNLC entry 71 includes the root handle 72, the alphanumeric name 73 for "dir1," and the handle 74 for "dir1." A second DNLC entry 75 includes the handle 76 for "dir1," an alphanumeric name 77 for "dir4," and a handle 78 for "dir4." A third DNLC entry 79 includes the handle 81 for "dir4," an alphanumeric name 82 for "file8," and a handle 83 for "file8."

The "findChildHandle" function introduced above is a conventional forward lookup in the DNLC for the "child handle" of a subdirectory or file having a specified "child name" in a directory specified by a "parent handle." A conventional DNLC is designed with a hashed forward mapping for performing this forward lookup in an efficient manner.

Occasionally a reverse lookup is desired in order to find the pathname for a given file handle. Often the file handle but not the pathname is reported when an error occurs during a read or write operation. The pathname may be desired in order to diagnose and recover from the error. Often statistics for access to open files are collected based on the file handles, and it is desired to know the pathnames of files having abnormal access statistics. If an efficient reverse lookup were provided for the DNLC, it would not only speed up the reverse lookup process but also facilitate new uses for the reverse lookup.

For example, an error is sometimes caused by a loss of access to a file in disk storage due to a disk storage failure or due to a migration of the file from the disk storage. A fast reverse lookup of the pathname from the file handle provides a pathname for generation of a new file handle for access to a backup copy of the file. The new file handle could be used for automatic recovery by access to the backup copy before a timeout would require the error to be reported to the user or application program.

In general, the new uses of the efficient reverse lookup could be programmed by the application requesting the file server to provide future notification to an application callback routine upon occurrence of a specified event during processing of a file access request including a file handle. When such an event occurs, the file server uses the file handle in a reverse lookup to report to the application callback routine the nature of the event and the file handle and full pathname of the file being accessed during the event.

In accordance with an aspect of the present invention, a DNLC is provided with an efficient reverse lookup capability. The efficient reverse lookup capability includes a hashed reverse mapping that can be dynamically enabled and disabled without substantial disruption to a hashed forward mapping of the DNLC. This capability can be provided without substantially increasing the memory footprint of the DNLC and without imposing a significant execution time penalty when the hashed reverse mapping is disabled.

Figure 4:
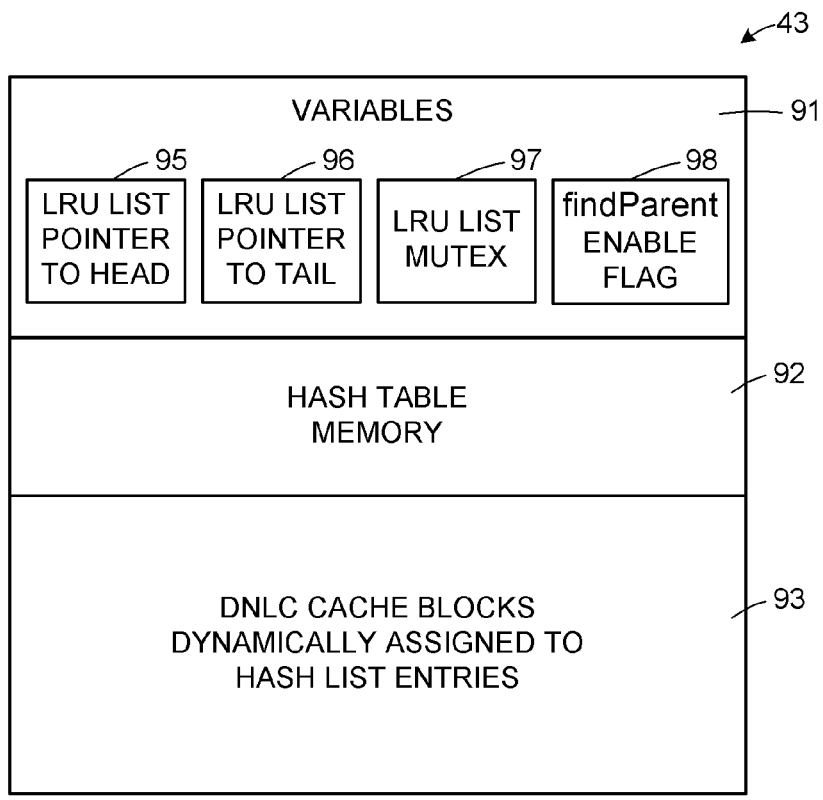
FIG. 4 is a block diagram of the DNLC introduced in FIG. 1.

FIG. 4 shows a memory map of the DNLC 43 including the efficient reverse lookup capability. The DNLC 43 includes variables 91, hash table memory 92, and memory 93 for DNLC cache blocks, which are dynamically assigned to respective hash list entries. The variables 91 include a pointer 95 to the head of a least recently used (LRU) list, a pointer 96 to the tail of the LRU list, a mutex (i.e., mutually exclusive lock) 97 for the LRU list, and a flag 98 for dynamically enabling and disabling the hashed reverse mapping capability of a "findParent" function.

A typical network file server includes memory 93 for about 400,000 DNLC cache blocks. The memory 93 for the DNLC cache blocks consumes most of the memory of the DNLC 43, although the hash table memory 92 is relatively large to achieve a fast lookup in the DNLC. For example, the hash table memory 92 is sized relative to the memory 93 for the DNLC cache blocks so that the mean hash list length is about two entries when "findParent" is disabled. When "findParent" remains enabled for an extended duration of time, for a DNLC as described below with reference to FIGS. 14 to 20, the mean hash length increases to about four entries.

The DNLC historically has included two kinds of lists linking the DNLC cache entries. These lists include "parent hash lists" of respective hash buckets indexed by a hash of the "parent handle" and the "child name", and a "least recently used" (LRU) list of the hash list entries. The parent hash lists have been anchored in respective rows of a hash table, so that each row provides a respective one of the hash buckets. For example, a hashing function combines the parent handle with the child name, and computes the remainder of an integer division of the combination by the number of hash buckets. The hash table is indexed with the remainder.

The parent hash lists and the LRU list have been doubly-linked for easy removal of a "least recently used" entry. The LRU list is anchored to the LRU head and tail pointers 95, 96 in the memory 91 for the variables. When an entry has been accessed during a DNLC cache lookup operation, it has been moved to the tail of the LRU list. Therefore, a "least recently used" entry has been found at the head of the LRU list.

When new directory information is to be stored in the DNLC cache, the entry at the head of the LRU list is preempted by removal from the head of the LRU list. The DNLC cache block of the preempted entry is reassigned to a new entry for the new directory information by storing the new directory information in the DNLC cache block, inserting the new entry at the head of the hash list of the new directory information by setting hash list link pointers in the DNLC cache block, and inserting the new entry at the tail of the LRU list by setting LRU list link pointers in the DNLC cache block.

In accordance with an aspect of the present invention, a set of links for a "child hash list" is added to each entry. A particular one of a number of child hash lists is determined by a hash of the "child handle." The "findParent" function hashes the child handle to index a child hash bucket, and searches the child hash list anchored to the child hash bucket. For example, the child handle is divided by the number of child hash buckets, and the remainder is used to index the child hash bucket. When any new entry is added to the DNLC (e.g., by insertion at the head of its parent hash list), if "findParent" is enabled (by the flag 98 in the variables 91), then the new entry is also added to its child hash list (e.g., by insertion at the head of its child hash list).

So that enabling and disabling of the reverse lookup "findParent" function will not significantly disrupt the forward lookup "findChildHandle" function, once an entry is put on a child hash list, it remains on the child hash list unless and until the entry is removed from its parent hash list. New entries are not inserted into the child hash lists when the "findParent" function is disabled. If the "findParent" function remains disabled for an extended duration of time, the child hash lists tend to become empty as the "least recently used" entries are preempted so that the DNLC cache memory blocks assigned to the "least recently used" entries can be reassigned to new entries. Once the child hash lists become empty, the performance of the forward lookup "findChildHandle" function is virtually the same as if the DNLC cache would not have the "findParent" function.

Figure 5:
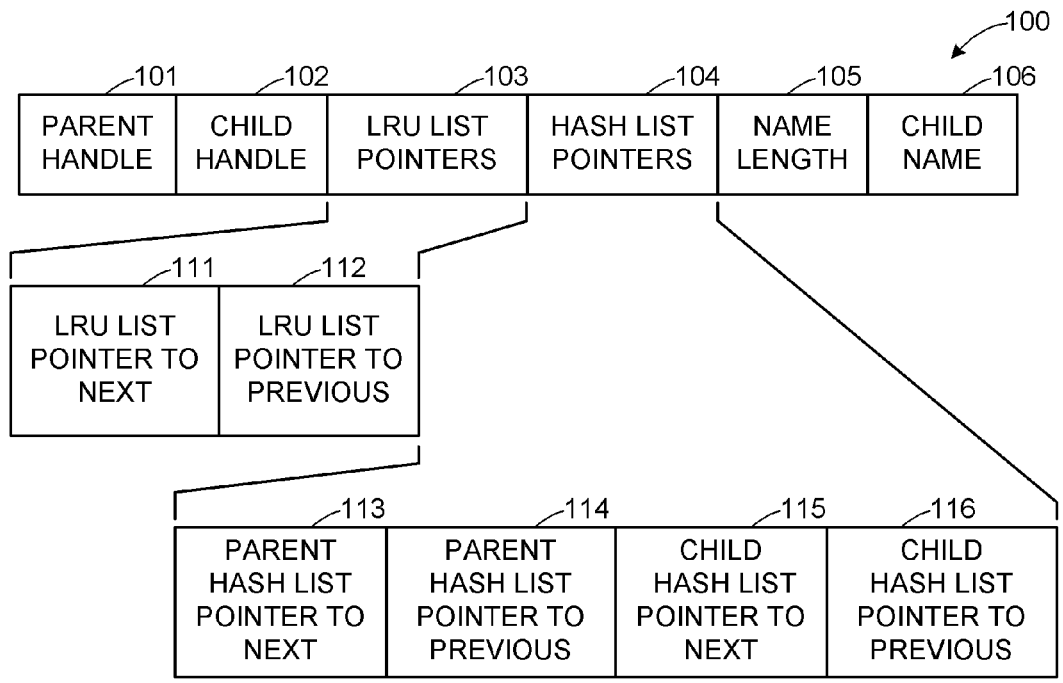
FIG. 5 is a block diagram of a DNLC cache entry.

FIG. 5 shows a DNLC cache entry 100. The DNLC cache entry 100 includes a parent handle 101, a child handle 102, LRU list pointers 103, hash list pointers 104, a name length 105, and a child name 106.

The name length field 105 permits the DNLC entries to have a variable length so that the child names in the DNLC can be very long. However, it is possible for the DNLC cache entries to have a fixed length, and the child name field 106 can be shorter than the maximum possible length of the names of the directories and files in the file system. If the name of the directory or file has a length longer than the maximum length of the child name field 106, then information for the directory or file is not cached in the DNLC. The DNLC cache manager simply reports a cache miss if it is requested to search the DNLC for a child name that is longer than the maximum length of the child name field 106.

The LRU list pointers 103 include a pointer 111 to the next entry in the LRU list, and a pointer 112 to the previous entry in the LRU list. The hash list pointers 104 include the typical "pointer to next" 113 and "pointer to previous" 114 for the parent hash list containing the DNLC cache entry 100. The hash list pointers 104 further include a "pointer to next" 115 and "pointer to previous" 116 for the child hash list containing the DNLC cache entry 100.

Since the "findParent" function can be dynamically enabled and disabled, the child hash list pointers need not be valid for a valid DNLC entry on a parent hash list. For example, in a preferred implementation, if the "findParent" function is disabled when a new entry is added to the DNLC cache, then the child hash list pointer to next 115 is set to a null or otherwise invalid value to indicate that the DNLC entry is not on any child hash list.

The child pointers 115 and 116 constitute the major cost in random access memory for implementation of the "findParent" function. One way of providing the increase in random access memory for the "findParent" function is to reduce the maximum size of the child name field 106. For example, if the "findParent" function is added to an existing DNLC having fixed length DNLC cache entries aligned on memory block boundaries, then the child name 106 is reduced in length by the sum of the lengths of the child hash list pointers 115, 116 in order to preserve the DNLC cache entry length and alignment.

There are various ways of indexing the child hash lists. The child hash lists may be anchored in rows of a hash table separate from the hash table in which the parent hash lists are anchored, or the child hash lists may be anchored in the rows of the same hash table as the parent hash lists. The following detailed description will first show how to anchor the child hash lists in rows of a hash table separate from the hash table of the parent hash lists, and later will show how to anchor the child hash lists in the rows of the same hash table as the parent hash lists. When the child hash list is anchored in rows of a hash table separate from the hash table in which the parent hash lists are anchored, the hash table in which the parent hash lists are anchored will be called the "parent hash table," and the hash table in which the child hash lists are anchored will be called the "child hash table."

Figure 6:
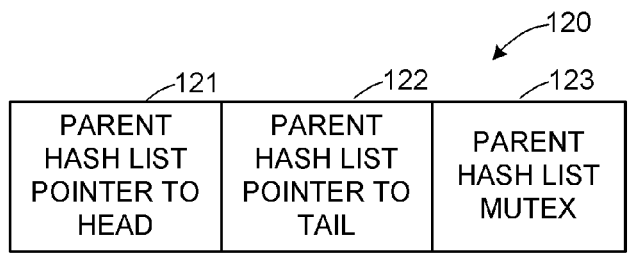
FIG. 6 is a block diagram of a row of a hash table of a conventional DNLC.

As shown in FIG. 6, if a separate hash table is used for anchoring the child hash lists, then the parent hash table may have a conventional DNLC hash table format. A row 120 in a conventional DNLC hash table includes a pointer 121 to the head of the parent hash list anchored to the row, a pointer 122 to the tail of the parent hash list, and a mutex 123 for the parent hash list. Initially the parent hash list pointer to head 121 is cleared to indicate that the parent hash list is empty, and the mutex 123 is cleared to indicate that the parent hash list is unlocked.

Typically the DNLC is accessed concurrently by multiple code threads for servicing file access requests from the network clients. The file server may have more than one data processor for execution of the code threads. Each code thread can be in an active state when the code thread is being executed by a data processor of the file server, or the code thread can be in an inactive state when the code thread is not being executed by any data processor of the file server. So that code thread executions can be interleaved in arbitrary order irrespective of the number of data processors, the DNLC provides a lock for each parent hash list and a lock for the LRU list. A code thread may acquire the lock on a parent hash list or the lock on the LRU list so that when execution of the code thread is suspended, the parent hash list or LRU list will not be accessed in an inconsistent fashion by another code thread. In order to reduce the memory requirements for the locks, each lock is a mutex (i.e., a mutually exclusive lock) that either permits or precludes read or write access.

Each child hash list could have its own lock. Alternatively, each child hash list could share a lock with a parent hash list. For example, when a single hash table is used as described further below with respect to FIGS. 14 to 19, the child hash list entries and the parent hash list entries for the same hash index share a lock on a bucket hash list that includes the child hash list entries and the parent hash list entries.

Figure 7:
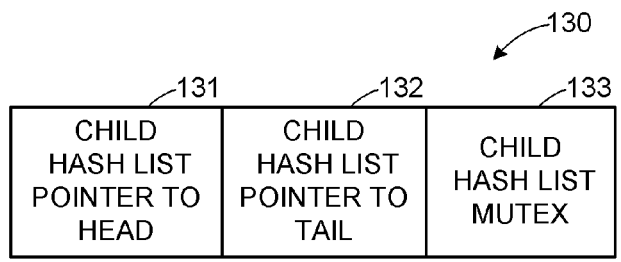
FIG. 7 is a block diagram of a row of a hash table of pointers to child hash lists in the DNLC of FIG. 4.

FIG. 7 shows a row 130 in a separate hash table for anchoring the child hash lists. The row 130 includes a pointer 131 to the head of the child hash list anchored to the row, a pointer 132 to the tail of the child hash list, and a mutex 133 for the child hash list. Initially the pointer 131 to the head of the child hash list is cleared to indicate that the child hash list is empty, and the mutex 133 is cleared to indicate that the child hash list is unlocked.

Figure 8:
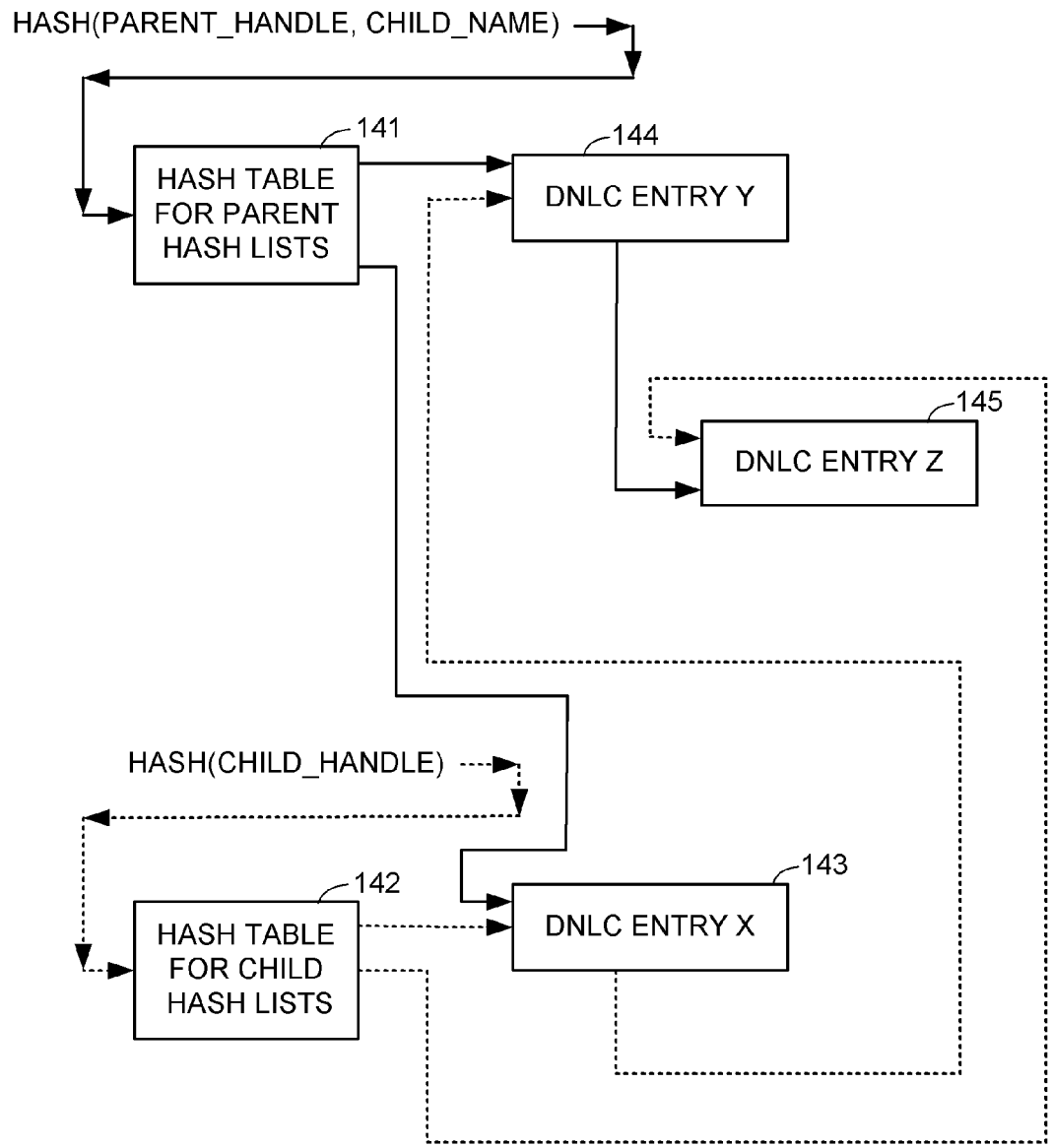
FIG. 8 is a schematic diagram showing hash list links between hash tables and cache entries in the DNLC of FIG. 4.

FIG. 8 shows parent and child hash list forward links between DNLC hash tables 141, 142 and DNLC cache entries 143, 144, 145. In this example, each row of the hash table 141 for the parent hash lists has the format of FIG. 6, and each row of the hash table 141 for the child hash lists has the format of FIG. 7. The parent hash list forward links are shown as solid lines, and the child hash list forward links are shown as dotted lines.

In order to maintain coherency of the DNLC during concurrent access by multiple code threads, an update to a DNLC cache entry is performed only after acquiring a lock on the parent hash list of the DNLC entry and a concurrent lock on the child hash list of the DNLC entry. This prevents the DNLC entry from being updated when another code thread is permitted to access the parent hash list with a lock on the parent hash list but not the child hash list, or when another code thread is permitted to access the child hash list with a lock on the child hash list but not the parent hash list. For example, to preempt the DNLC entry at the head of the LRU list, the parent hash list is locked, the DNLC entry is accessed to determine its child hash list if any, a lock is put on its child hash list if any, and then the DNLC entry is unlinked from both the parent hash list and its child hash list if any, and then the locks are released.

Figure 9:
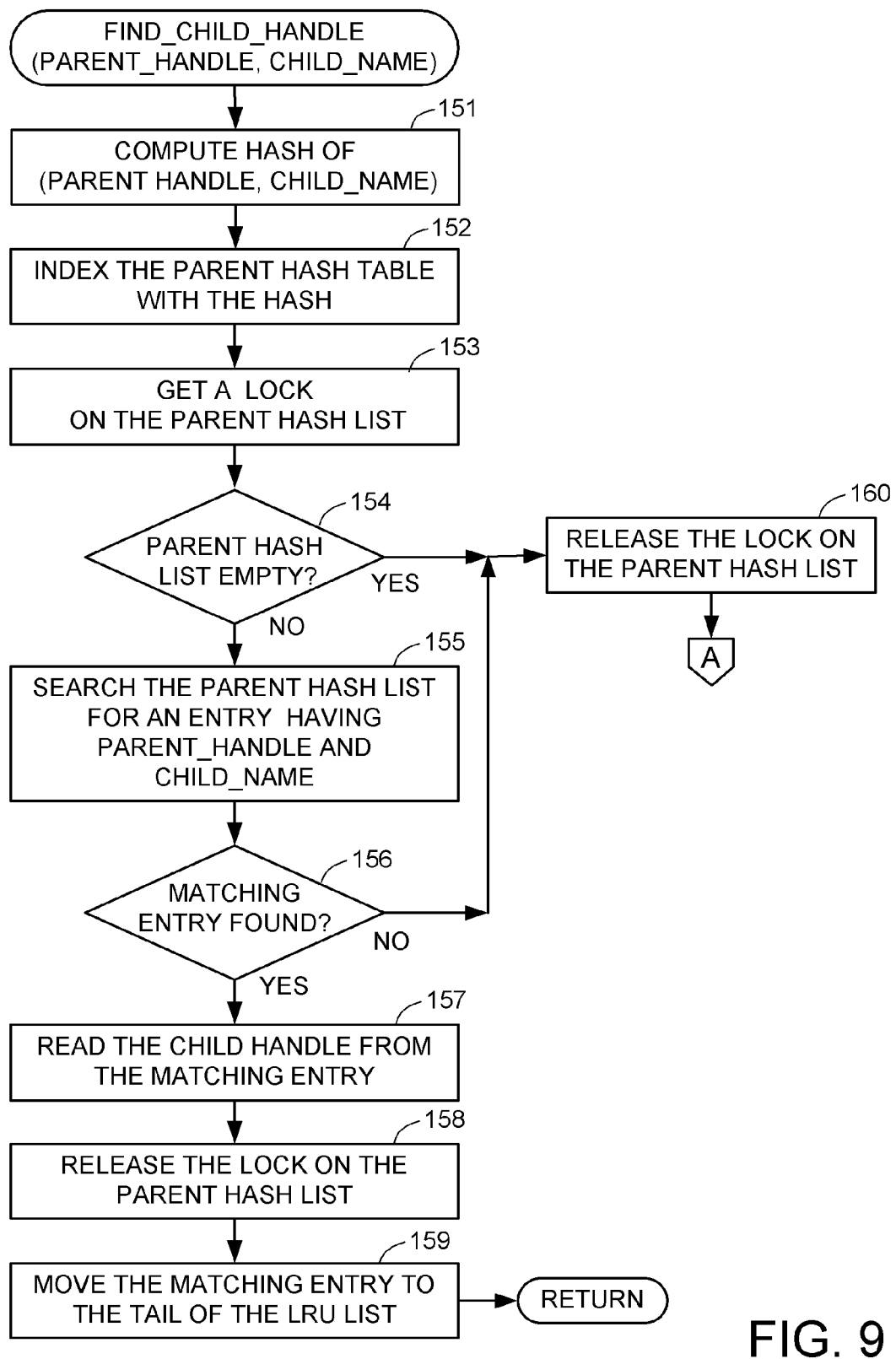
FIGS. 9 and 10 together comprise a flowchart of a "findChildHandle(parent_handle, child_name)" function providing a forward lookup in the DNLC of FIG. 4.
Figure 10:
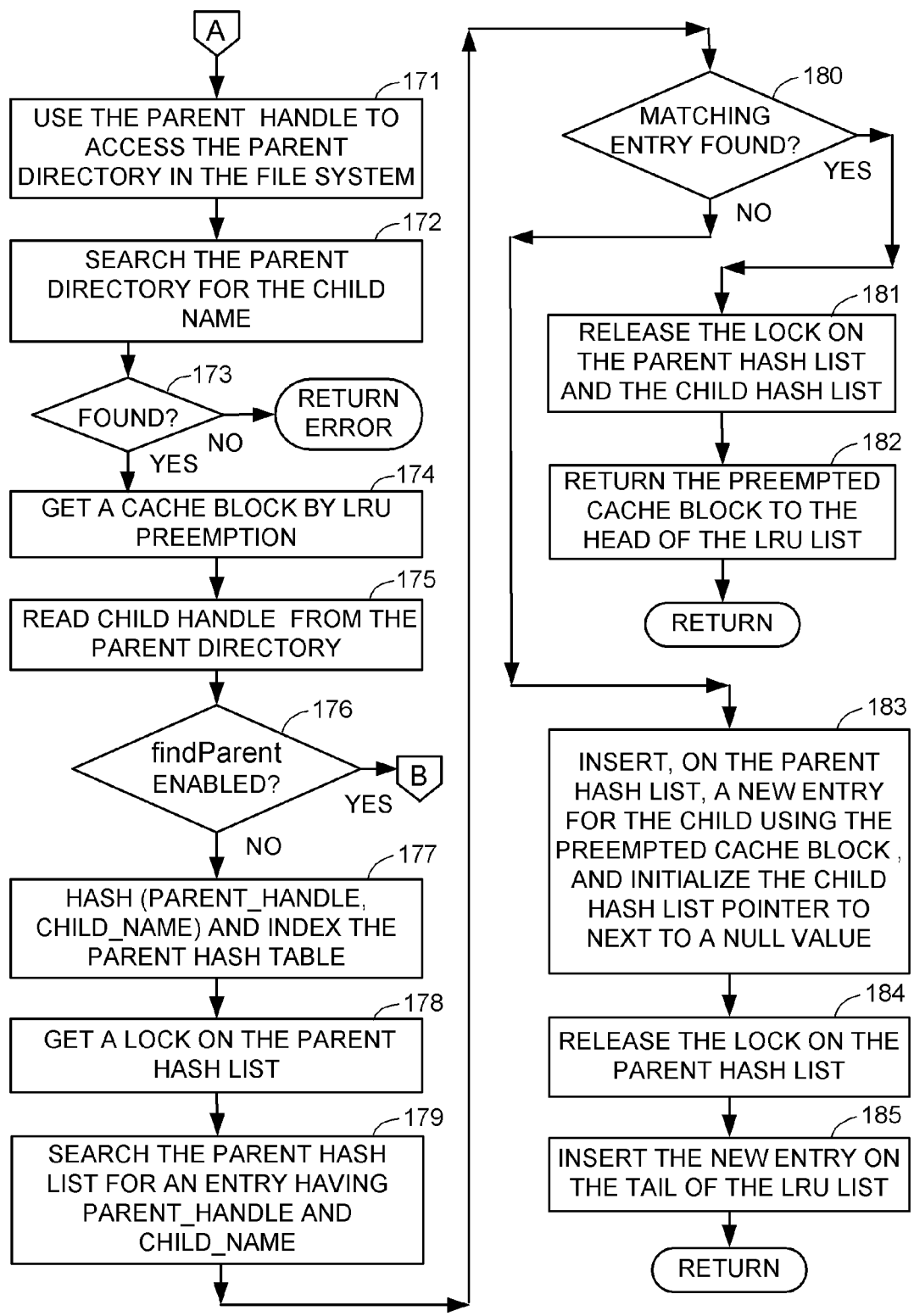

FIGS. 9 and 10 show the "findChildHandle(parent_handle, child_name)" function. This function requires locking of the parent hash list for the hashing of the parent handle and the child name, but does not require locking of the child hash list of the child handle for finding the child handle in the DNLC. In a first step 151 of FIG. 9, the DNLC cache manager computes the hash of the parent handle and the child name. Then in step 152, the parent hash table is indexed with the hash. In step 153, a lock is obtained on the parent hash list. In step 154, if the parent hash list is not empty, then execution continues to step 155. In step 155, the DNLC manager searches the parent hash list for a DNLC cache entry having the specified parent handle and child name. In step 156, if a matching entry is found, then in step 157, the child handle is read from the matching entry.

In step 158, the lock is released from the parent hash list. In step 159, the matching entry is moved to the tail of the LRU list. For example, the lock on the LRU list is obtained, and then the matching entry is unlinked from the LRU list, and then the matching entry is inserted at the tail of the LRU list, and then the lock on the LRU list is released. Then execution returns with the child handle found in the matching DNLC cache entry.

If the parent hash list was found to be empty in step 154 or no matching DNLC cache entry was found on the parent hash list in step 156, execution branches to step 160 to release the lock on the parent hash list. Thus, there has been a DNLC cache miss. Execution continues from step 160 to step 171 in FIG. 10.

In step 171 in FIG. 10, the parent handle is used to access the parent directory in the file system. In step 172 the parent directory is searched for the specified child name. In step 173, if the child name was not found in the parent directory, then execution returns with an error indication that the child was not found. Otherwise, if the child was found, execution continues from step 173 to step 174. In step 174, a DNLC cache block is obtained by invoking an LRU preemption function further described below with reference to FIG. 11. Then in step 175, the child handle is read from the parent directory.

Figure 13:
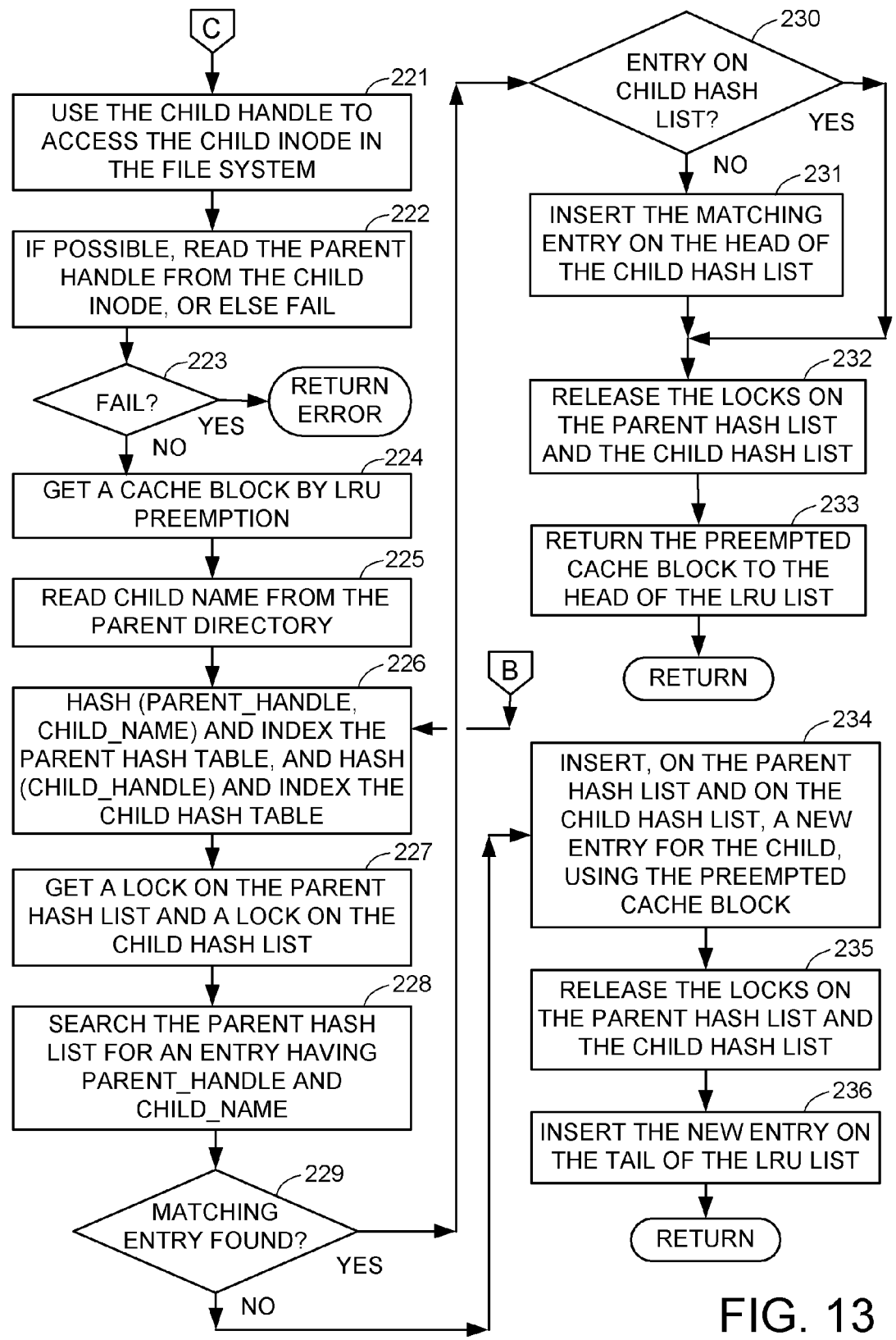

In step 176, if the findParent function is enabled (as indicated by the findParent flag 98 of FIG. 4), then execution branches to step 226 of FIG. 13 in order to add a new entry to the cache (unless such a new entry has already been added recently) and to put this new entry on its parent hash list and on its child hash list. This will be further described below with reference to FIG. 13. If the findParent function is not enabled, then execution continues from step 176 to step 177 to add a new entry to the cache (unless such a new entry has already been added recently) and to put this new entry on its parent hash list but not on any child hash list.

In step 177, the parent handle and child name are hashed, and the parent hash table is indexed with the hash. In step 178, a lock is obtained on the parent hash list anchored to the indexed row of the parent hash table. In step 179, the parent hash list is searched for an entry having the parent handle and the child name. In step 18, if such a matching entry is found, execution branches to step 181. In step 181, the lock on the parent hash list is released, and in step 182, the preempted cache block is returned to the head of the LRU list, and execution returns.

In step 180, if a matching entry is not found, execution continues to step 183. In step 183, the DNLC cache block from the LRU preemption of step 174 is used for inserting, on the parent hash list, a new DNLC cache entry for the child. In this new DNLC cache entry, the child hash list pointer to next is set to a null or otherwise invalid pointer value because "findParent" was not enabled. In step 184, the lock on the parent hash list is released. In step 185, the new entry is inserted at the tail of the LRU list, and execution returns with the child handle read from the parent directory.

Figure 11:
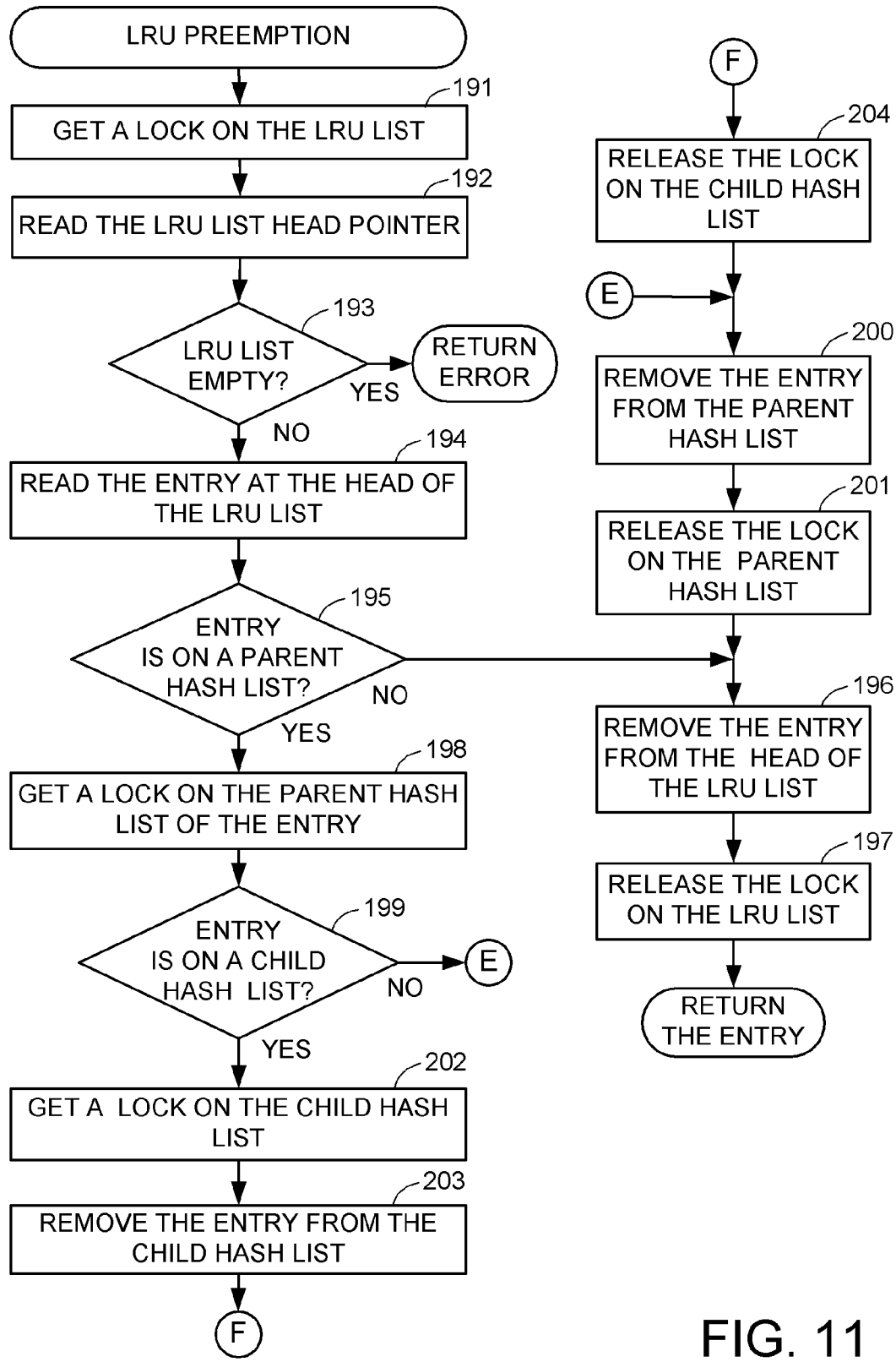
FIG. 11 is a flowchart of a function for preemption of a "least recently used" cache entry in the DNLC of FIG. 4.

FIG. 11 shows a function for preempting a "least recently used" DNLC cache entry. This function requires concurrent locking of the parent hash list and any child hash list of the "least recently used" DNLC cache entry. In a first step 191, the DNLC cache manager gets a lock on the LRU list. Then in step 192, the LRU list head pointer is read. In step 193, execution returns with an error if the LRU list is empty. Otherwise, execution continues to step 194 to read the entry at the head of the LRU list.

In a preferred implementation, the LRU list is initialized by placing all of the DNLC cache blocks on the LRU list, and initially marking all of these DNLC cache blocks as not being on any parent hash list. For example, each DNLC cache block initially is marked as not being on any parent hash list by setting its "parent list pointer to next" field to a null or otherwise invalid value for a parent list pointer. Also, in the preferred implementation, if a DNLC cache block entry is not on any parent hash list, it is not on any child list either. For example, a DNLC cache entry is never added to a child hash list unless it is on a parent hash list, and a DNLC cache entry is never removed from a parent hash list unless it is not on any child hash list.

In step 195, if the entry read from the head of the LRU list is marked as not being on a parent hash list, then execution branches to step 196. In this case, the entry at the head of the LRU list is not on any child hash list either. In step 196, the entry is removed from the head of the LRU list. In step 197, the lock on the LRU list is released, and execution returns with the entry removed from the head of the LRU list.

In step 195, if the entry is on a parent hash list, then execution continues to step 198. In step 198, a lock is obtained on the parent hash list of the entry at the head of the LRU list. For example, the parent handle and child name are read from the entry, the hash of the parent handle and child name is computed, the parent hash table is indexed with the hash, and a lock is obtained on the mutex in the indexed row of the parent hash table. In step 199, the child hash list "pointer to next" in the entry at the head of the LRU list is inspected to determine whether it is valid for a list pointer. If not, the entry is not on a child hash list, and execution branches to step 200. In step 200, the entry is removed from is parent hash list, and in step 201, the lock is on the parent hash list is released. Execution then continues to step 196 to remove the entry from the head of the LRU list, and to step 197 to release the lock on the LRU list, and to return the entry.

In step 199, if the entry at the head of the LRU list is on a child hash list, then execution continues to step 202. In step 202, a lock is obtained on the child hash list. For example, the "child handle" is read from the entry at the head of the LRU list, and the child handle is hashed to obtain an index to the child hash table, in order to access the mutex from the indexed row of the child hash table and obtain a lock on the child hash list. Once a lock is obtained on the child hash list, in step 203 the entry at the head of the LRU list is removed from the child hash list. Then in step 204 the lock on the child hash list is released, and execution continues to steps 200 to 197 to remove the entry from the parent hash list, to release the lock on the parent hash list, to remove the entry from the head of the LRU list, to release the lock on the LRU list, and to return the entry removed from the head of the LRU list.

Figure 12:
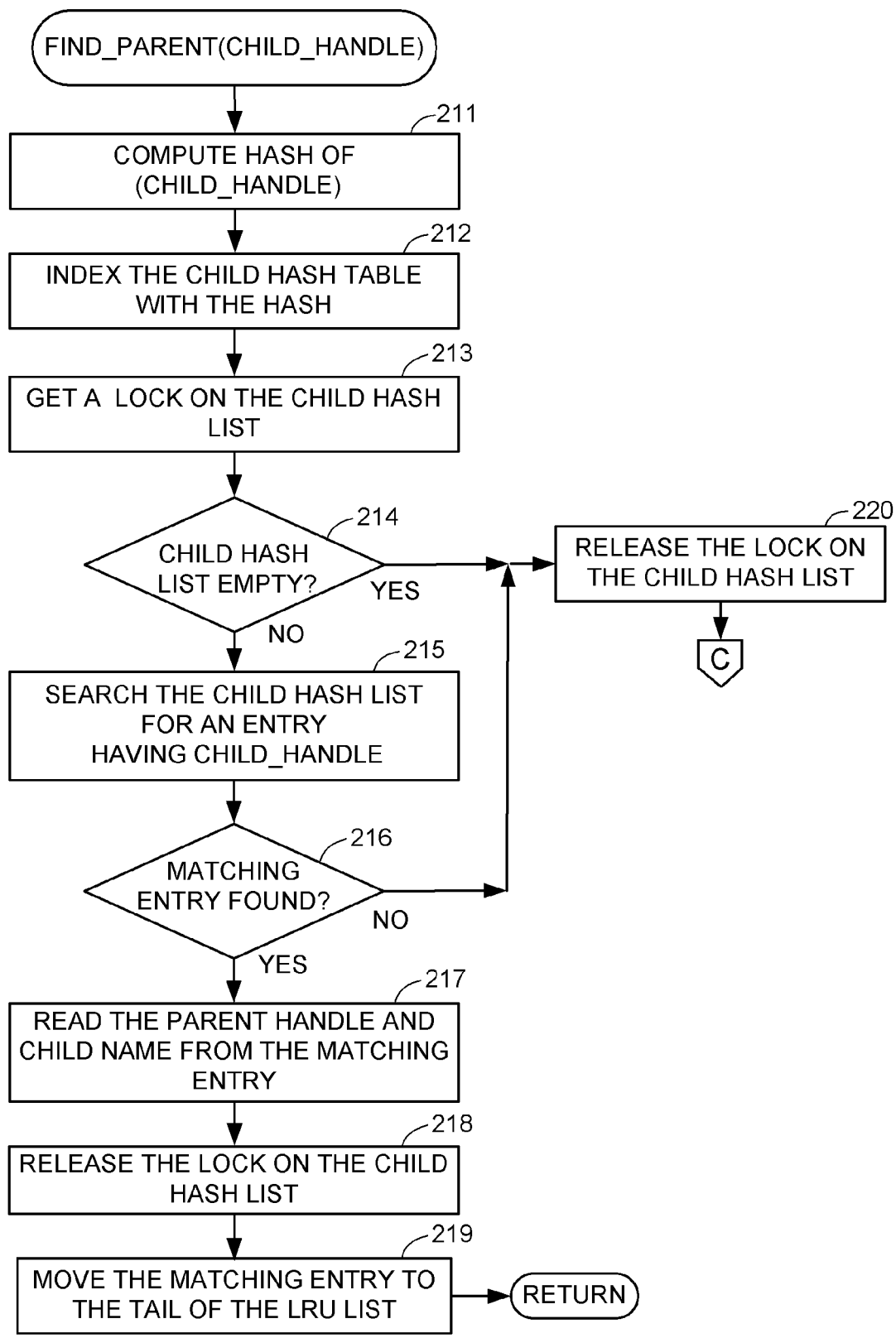
FIGS. 12 and 13 together comprise a flowchart of a "findParent(child_handle)" function providing a reverse lookup in the DNLC of FIG. 4.

FIGS. 12 and 13 together show the "findParent (child_handle)" function. This function requires locking of the child hash list for the child handle, but does not require locking of the parent hash list for finding the parent handle and the child name in the DNLC. In a first step 211, the DNLC cache manager computes the hash of the child handle for indexing the child hash table. In step 212, the child hash table is indexed with the hash. In step 213, a lock is obtained on the child hash list anchored to the indexed entry of the child hash table. In step 214, if the child hash list is not empty, then execution continues to step 215. In step 215, the child hash list is searched for a DNLC cache entry having the specified child handle. In step 216, if such a matching DNLC cache entry is found, then execution continues to step 217.

In step 217, the parent handle and the child name are read from the matching entry. In step 218, the lock on the child hash list is released. In step 219, the matching entry is moved to the tail of the LRU list, and execution returns with the parent handle and the child name from the matching DNLC cache entry.

If the child hash list is found to be empty in step 214 or if a matching DNLC cache entry is not found in step 216, then execution branches to step 220 to release the lock on the child hash list. Execution continues from step 220 to step 221 of FIG. 13. In step 221, the child handle is used to access the child inode in the inode cache or in the on-disk file system. In step 222, if possible, the parent handle is read from the child inode, or else the operation fails. Typically, unless the child is a directory, the parent handle cannot be read from the child inode, so that an exhaustive search of the directory hierarchy would be required to find a parent directory including the child handle. Such an exhaustive search should not be performed unless it would be specifically requested by a client or application. The DNLC reverse lookup of the present invention avoids such a laborious search in many cases when there is a "hit" in the DNLC. Therefore, in step 223, if the parent handle cannot be read from the child inode, the operation fails and an error code is returned indicating that the operation failed to avoid a search of the entire file system. If the parent handle can be read from the child inode, then execution continues to step 224.

In step 224, a "least recently used" cache block is obtained by invoking the LRU preemption function of FIG. 11, in order to have a cache block available for storing a new cache entry for the parent handle read in step 222. In step 225, the child name is read from the parent directory. In step 226, the hash of the parent handle and child name is computed and used for indexing the parent hash table, and a hash of the child handle is computed and used for indexing the child hash table. In step 227, a lock is obtained on the parent hash list, and a lock is obtained on the child hash list. In step 228, the parent hash list is searched for a DNLC cache entry having the specified parent handle and child handle. In step 229, if a matching entry is found on the parent hash list, then execution branches to step 230. In step 230, the child list "pointer to next" of the matching DNLC entry is inspected to determine if the matching entry is on a child hash list. If the matching DNLC entry is not on a child hash list, then in step 231, the matching entry is inserted on the head of its child hash list, and execution continues to step 232. Execution also branches from step 230 to step 232 if the entry is on a child hash list. In step 232, the lock on the parent hash list is released, and the lock on the child hash list is released. In step 233, the preempted cache block (from step 224) is returned to the head of the LRU list.

In step 229, if a matching DNLC cache entry is not found on the parent hash list, then execution branches to step 234 in order to insert a new DNLC cache entry having the parent handle, child handle, and child name, on the parent hash list and on the child hash list, using the preempted cache block (from step 224). In step 235, the lock on the parent hash list is released, and the lock on the child hash list is released. In step 236, the new entry is inserted on the tail of the LRU list. Then execution returns with the parent handle and child name.

Figure 14:
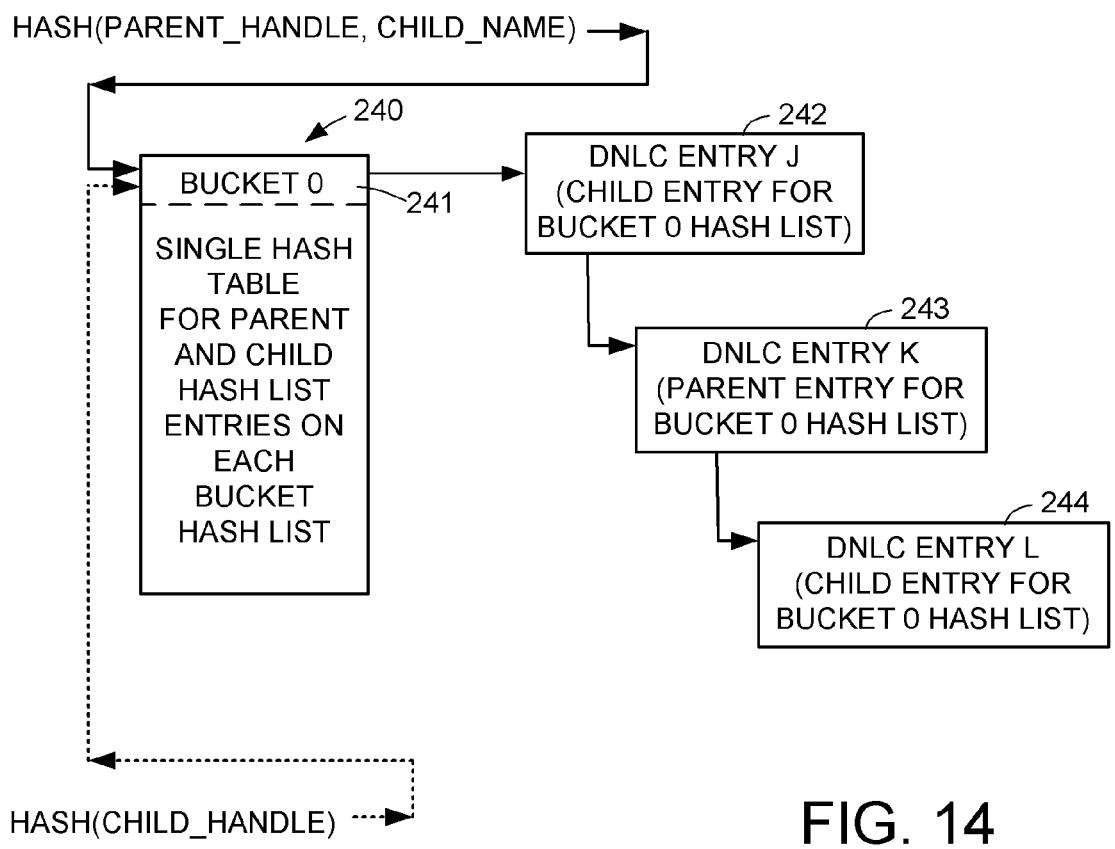
FIG. 14 is a schematic diagram showing the use of a single hash table for indexing parent and child hash list entries on each bucket hash lists.

FIG. 14 shows a way of using a single hash table 240 for the parent and child hash lists. In this example, the single hash table 240 may have the format of a conventional hash table, so that a row of the hash table 240 has the format of FIG. 6. However, the hash list for each hash bucket includes not only parent entries having a hash of the parent handle and child name that indexes the hash bucket, but also child entries having a hash of the child handle that indexes the hash bucket. For example, FIG. 14 shows that the first hash bucket 241 with a hash index of zero includes a bucket hash list including an entry 242 that is a child entry for this bucket hash list, and entry 243 that is a parent entry for this bucket hash list, and an entry 244 that is a child entry for this bucket hash list.

By including both parent entries and child entries on each bucket hash list, the length of the bucket hash list becomes about twice as long when "findParent" has been enabled for a sufficient length of time. The time for searching a bucket hash list for a parent entry having a specified parent handle and a specified child name, however, is not necessarily doubled by the doubling of the length of the list because it is possible to identify and skip over the child entries on the list without inspection of the parent handle and child name in these child entries. The search process will be described further below with reference to FIG. 19.

By using a single hash table for indexing the parent hash lists and the child hash lists, it is possible to add a hashed reverse lookup capability to an existing DNLC without any increase in the amount of the hash table random access memory. However, one problem that arises is avoiding deadlocks that might otherwise occur when a code thread attempts to obtain concurrent locks on the parent hash list and on the child hash list of an entry. With respect to the DNLC set up as shown in FIG. 14, the parent hash list of the entry is the bucket hash list for the bucket indexed by the hash of the parent handle and child name in the entry, and the child hash list of the entry is the bucket hash list for the bucket indexed by the hash of the child handle of the entry.

A deadlock might be possible when execution of a first code thread has obtained a lock on a first bucket for accessing the parent hash list anchored in the first bucket and the first code thread is seeking a lock on a second bucket for accessing the child hash list anchored in the second bucket, and execution of a second code thread has obtained a lock on the second bucket for accessing the parent hash list anchored in the second bucket and the second code thread is seeking a lock on the first bucket for accessing the child hash list anchored in the first bucket. The hash bucket to which the parent hash list is anchored will be referred to as the parent bucket, and the hash bucket to which the child hash list is anchored will be referred to as the child bucket.

There are at least two ways to avoid deadlocks between code threads each having a lock on a parent bucket and attempting to obtain a lock on a child bucket. One way is for the thread to try to obtain a lock on the child bucket, and if the attempt fails, then release its lock on the parent bucket, suspend and resume execution, and then attempt to again lock the parent bucket, and then lock the child bucket. This method will be described further below with reference to FIG. 15. In a preferred implementation, this method is used during LRU preemption. Another way is to establish a total ordering over the two conflicting locks being sought by the two code threads, so that one lock is given priority. This reduces the frequency that a code thread will give up the lock that it already has. Because the buckets of the single hash table are already sorted by the value of the hash table index, it is easy to give priority based on the value of the hash table index. This method is described further below with reference to FIG. 16. In a preferred implementation, this method is used when an entry is extracted from a parent hash list for re-use, and when an entry is inserted onto its child hash list.

Figure 15:
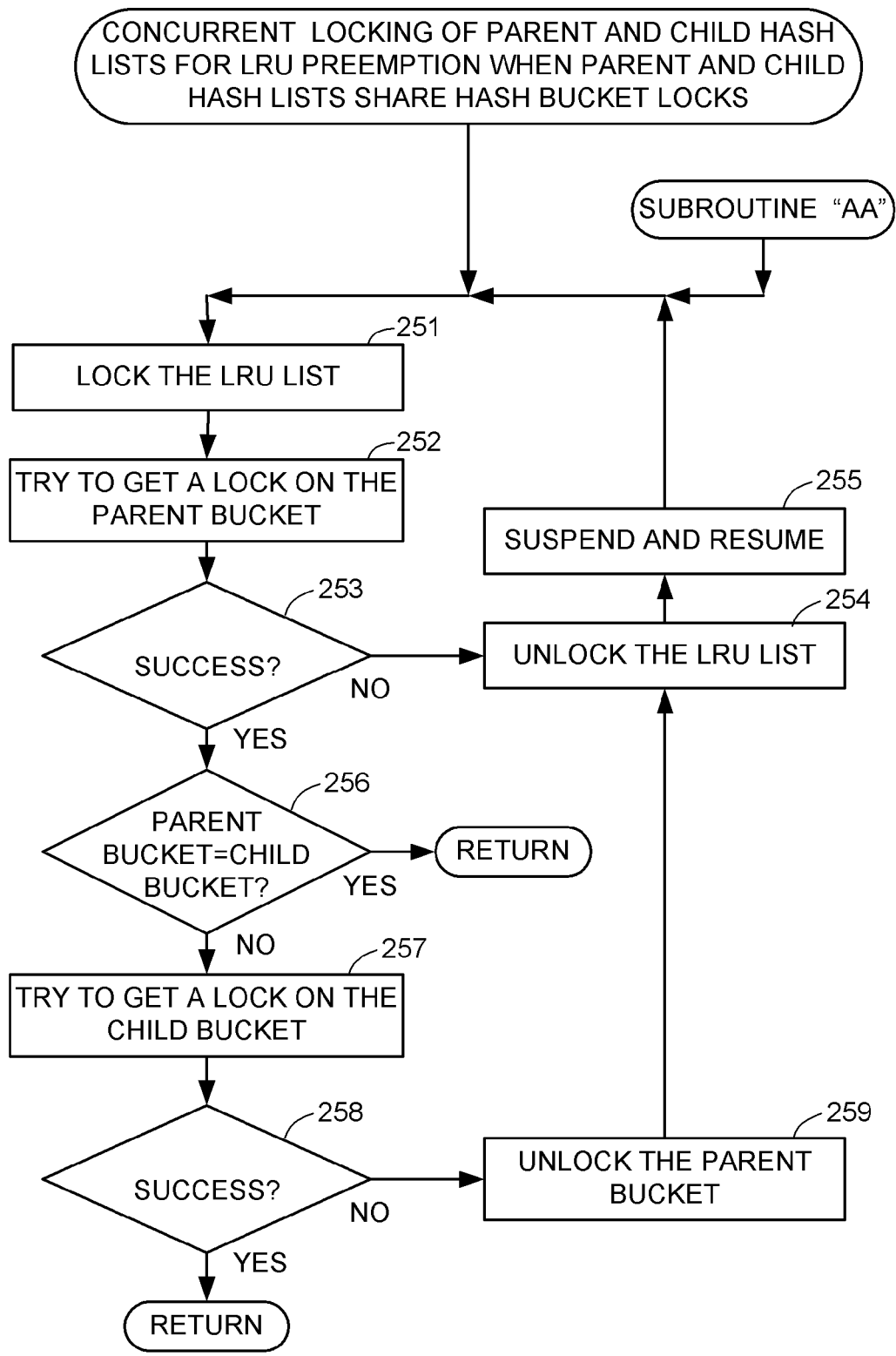
FIG. 15 is a flowchart of a subroutine called by a thread for obtaining concurrent locks on a least recently used (LRU) list and a parent hash bucket and a child hash bucket for preemption of a cache entry in the DNLC when the parent and child hash lists share hash bucket locks.

FIG. 15 shows the lock management subroutine invoked by a code thread for concurrent locking of a parent hash list and a child hash list for LRU preemption when the parent hash lists and the child hash lists share hash bucket locks. In a first step 251, the LRU list is locked. In step 252, the code thread tries to get a lock on the parent bucket. When the subroutine of FIG. 15 is used for LRU preemption, an entry at the head of the LRU list is being preempted, and this entry has a parent bucket that is indexed by the hashing of a parent handle and child name in the entry at the head of the LRU list, and a child bucket that is indexed by the hashing of a child handle in the entry at the head of the LRU list. In step 253, if code thread was not successful in getting the lock on the parent bucket (because the lock presently is held by another code thread), then execution branches to step 254. In step 254, the LRU list is unlocked. In step 255, execution of the code thread is suspended, and upon resuming, execution of the code thread loops back to step 251.

A consequence of unlocking the LRU list in step 254 is that a different cache block might be found at the head of the LRU list when step 252 is repeated. If a different cache block is found at the head of the LRU list when step 252 is repeated, then execution could return after step 251 if the cache block is not presently assigned to an entry (as indicated by a null value in its parent hash list pointer-to-next). Also if a different cache block is found at the head of the LRU list, then it is possible that it is assigned to an entry that is not on a child hash list (as indicated by a null value in its child hash list pointer-to-next), so that the entry would not have a child bucket needing to be locked and execution could return immediately once a lock is obtained on the parent bucket upon repeating step 252.

In step 253, if the code thread was successful in getting a lock on the parent bucket, then execution continues to step 256. In step 256, if the parent bucket is the same as the child bucket, then the child bucket is already locked by virtue of the lock on the parent bucket, so execution returns. Otherwise, execution continues from step 256 to step 257. In step 257, the code thread tries to get a lock on the child bucket. In step 258, if the code thread was not successful in getting a lock on the child bucket (because a lock is presently being held on the child bucket by another code thread), then execution continues to step 259 to unlock the parent bucket, and execution loops back to step 254. In step 258, if the code thread was successful in getting a lock on the child bucket, then execution returns.

Figure 16:
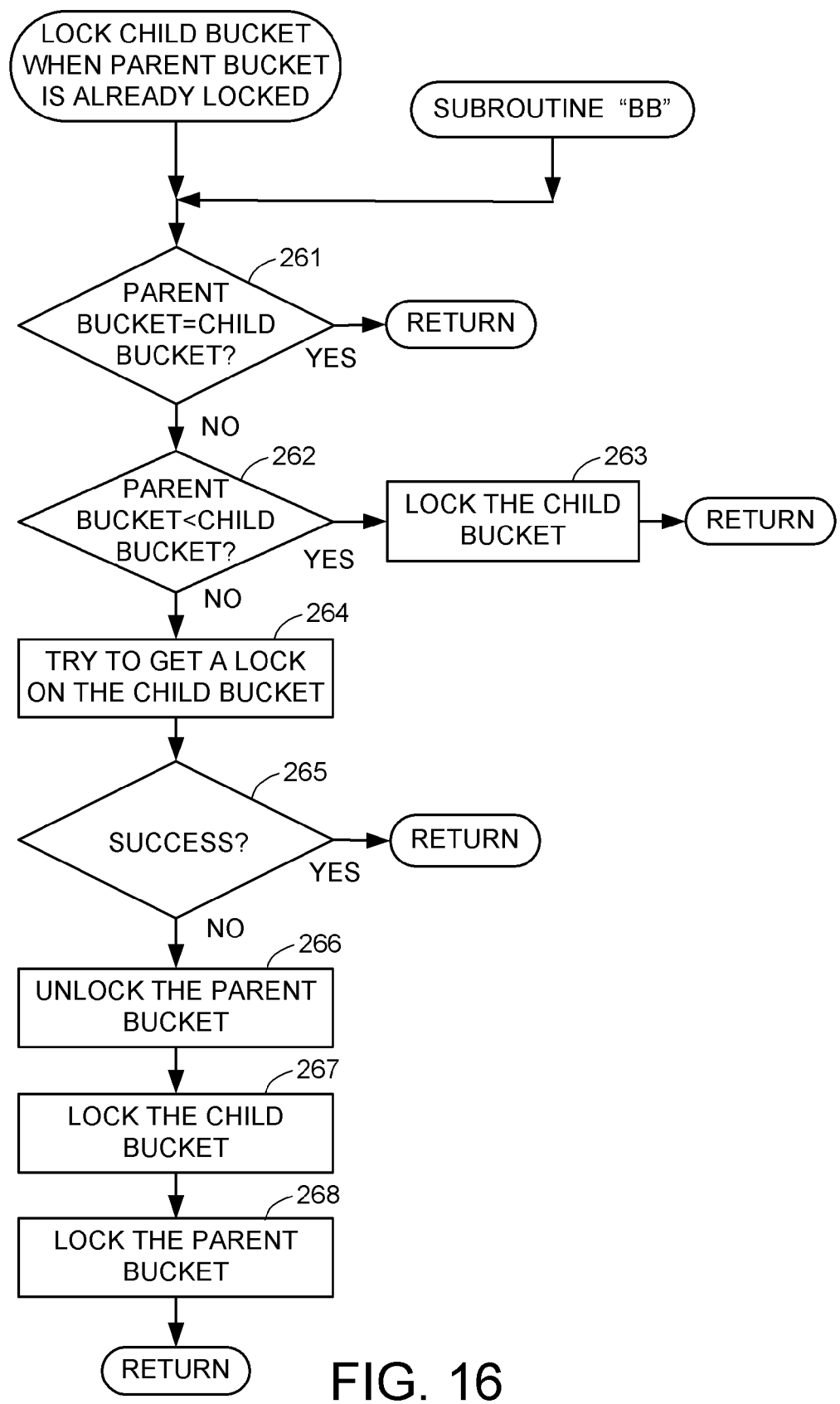
FIG. 16 is a flowchart of a subroutine called by a thread for obtaining a lock on a child hash bucket concurrent with an existing lock on a parent hash bucket when inserting or removing an entry on a child hash list when the parent and child hash lists share hash bucket locks.

FIG. 16 shows the lock management subroutine invoked by a code thread for locking of a child bucket when a parent bucket is already locked for an entry being extracted from a parent hash list for re-use or for an entry being inserted onto its child hash list. A precondition for using this subroutine is that the entry should be removed from the LRU list. In a first step 261, if the parent bucket is the same as the child bucket, then execution returns because the lock already held on the parent bucket also permits access to the child hash list. Otherwise, execution continues from step 261 to step 262.

In step 262, if the index of the parent bucket is less than the index of the child bucket, then execution branches to step 263 in order to lock the child bucket, and then execution returns. If there is presently a conflict with another code thread that holds the lock on child bucket and is seeking a lock on the parent bucket, then this other code thread will be giving up its lock on the child bucket.

In step 262, if the index of the parent bucket is not less than the index of the child bucket, then execution continues to step 264 to try to get a lock on the child bucket. If the code thread is successful in getting the lock (because the lock is not presently held by another code thread), then execution returns. Otherwise, execution continues from step 265 to step 266. In step 266, the code thread unlocks the parent bucket so that it becomes possible to avoid a deadlock and lock the child bucket in step 267. In step 268, the parent bucket is locked, and execution returns.

Figure 17:
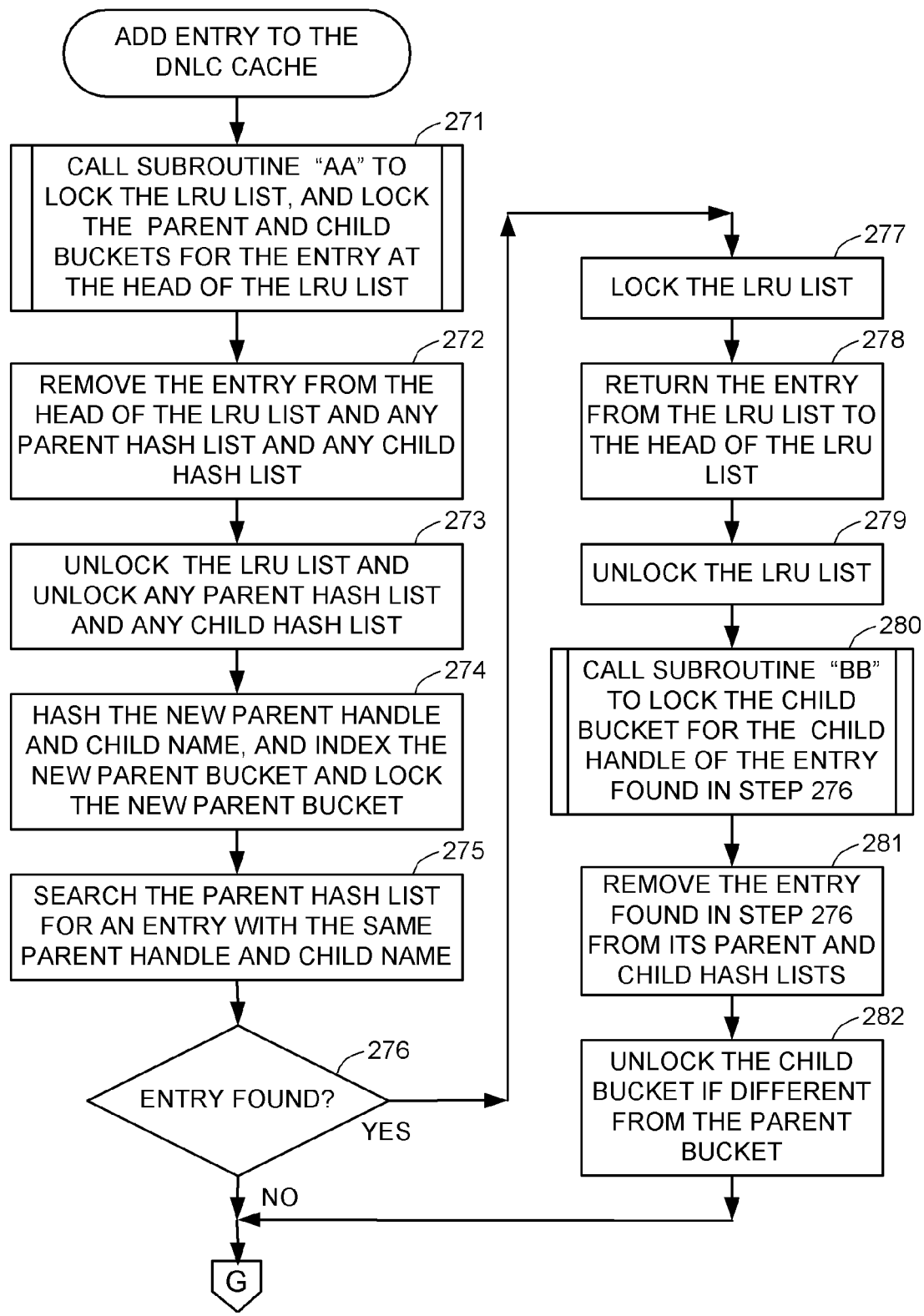
FIGS. 17 and 18 comprise a flowchart of a procedure calling the subroutines of FIGS. 16 and 17 for adding an entry to the DNLC cache using either the cache block of a preempted entry or the cache block of an entry having the same parent handle and child name as the entry to be added to the DNLC cache.
Figure 18:
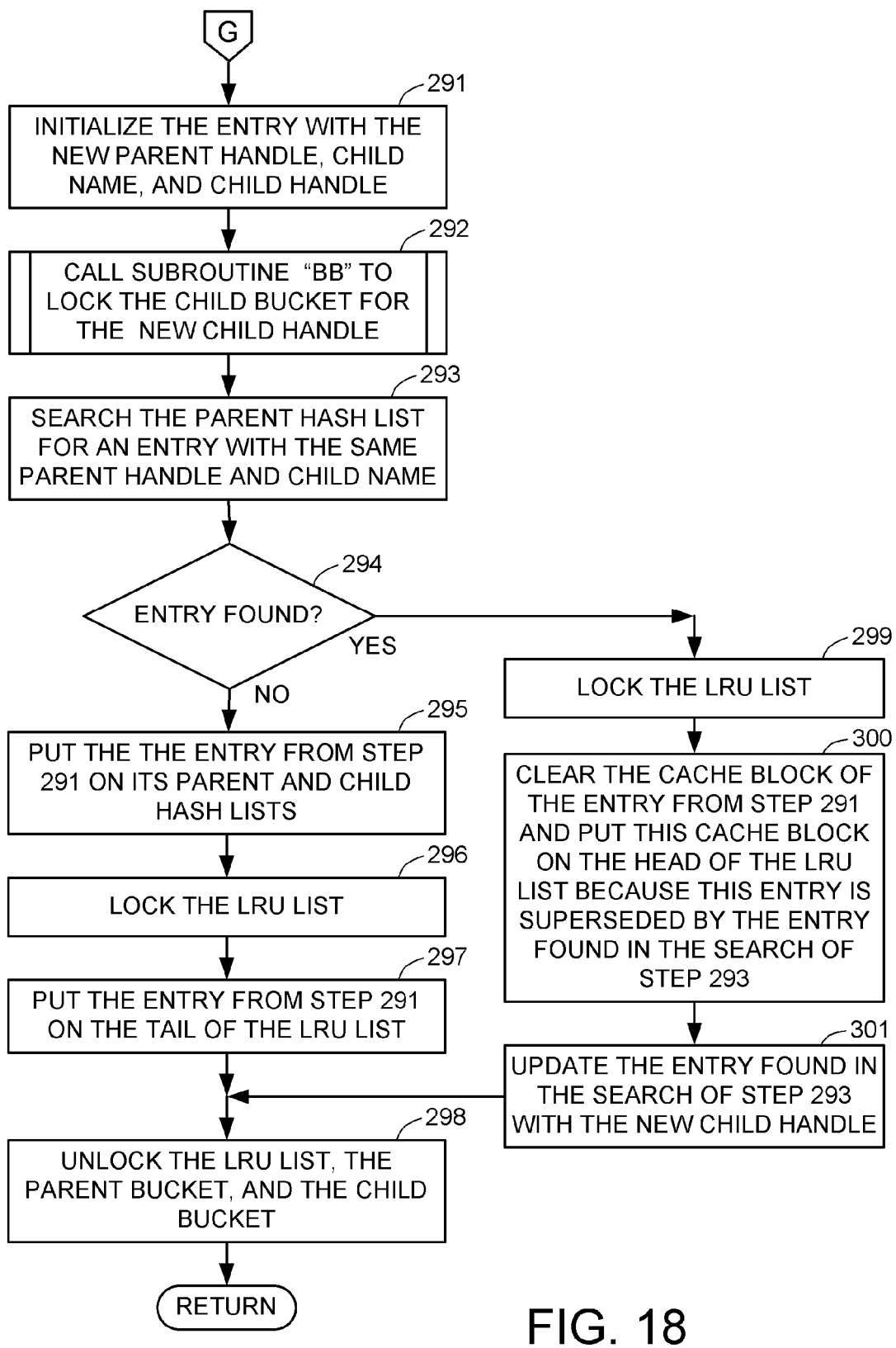

FIGS. 17 and 18 show how the lock management subroutines of FIGS. 15 and 16 are used for adding an entry to the DNLC cache. The entry added to the DNLC cache can be a new entry using the cache block of a preempted entry, or the entry added to the DNLC can be an entry that re-uses a cache block of an entry with the same parent handle and child name. For example, an entry that re-uses a cache block of an entry with the same parent handle and child name could be added to the cache when there is a change in the child handle in order to instantaneously restore a file with a backup copy.

In a first step 271 of FIG. 17, the subroutine of FIG. 15 is called at the entry point "AA" in order to lock the LRU list, and to lock the parent and child buckets for the entry at the head of the LRU list. Then in step 272, the entry at the head of the LRU list is removed from the LRU list and any parent hash list and any child hash list. In step 273, the LRU list and any parent hash list and any child hash list are unlocked. In step 274, the new parent handle and child name of the entry to be added are hashed and the hash is used to index the new parent bucket and to lock the new parent bucket. In step 275, the parent hash list is searched for an entry with the same parent handle and child name. In step 276, if a matching entry is found, then execution branches to step 277 in order to re-use the cache block of the matching entry found on the parent hash list after returning the cache block of the preempted entry to the LRU list.

In step 277, the LRU list is locked. In step 278, the cache block of the entry preempted from the LRU list (in step 272) is returned to the head of the LRU list. (This cache block has its parent hash list "pointer to next" set to a null value to indicate that it is not assigned to any cache entry.) In step 279, the LRU list is unlocked. In step 280, the subroutine of FIG. 16 is called at the entry point "BB" to lock the child bucket for the child handle of the matching entry found in step 276. In step 281, the matching entry found in step 276 is removed from its parent and child hash lists. In step 282, the child bucket for the matching entry found in step 275 is unlocked if it is different from its parent bucket. Execution continues from step 282 to step 291 of FIG. 18. Execution also continues to step 291 of FIG. 18 from step 276 if a matching entry is not found.

In step 291 of FIG. 18, the cache block of the matching entry (if continuing from step 282) or the cache block of the preempted entry (if continuing from step 276) is loaded with the new parent handle, child name, and child handle so as to initialize the entry being added to the DNLC cache. In step 292, the subroutine of FIG. 16 is called at the entry point "BB" in order to lock the child bucket for the new child handle. In step 293, the parent hash list is searched for an entry with the same parent handle and child name. It is possible that such a matching entry was just added. In the usual case, such an entry is not found, and execution continues to step 295. In step 295, the entry from step 291 is put on its parent and child hash lists. In step 296, the LRU list is locked. In step 297, the entry from step 291 is put on the tail of the LRU list. In step 298, the LRU list is unlocked, the parent bucket is unlocked, and the child bucket is unlocked, and execution returns.

In step 294, if a matching entry is found, execution branches to step 299 to lock the LRU list. Then in step 300 the cache block of the entry from 291 is cleared (by setting its parent hash list "pointer to next" to a null value), and this cache block is put on the head of the LRU list because this entry is superseded by the entry found in the search of step 293. In step 301, the entry found in the search of step 293 updated with the new child handle. At this point, the entry found in the search of step 293 was very recently added to the cache, so there is no need to move it to the tail of the LRU list. Execution continues to step 298 to unlock the LRU list, the parent bucket, and the child bucket, and then execution returns.

The procedure of FIG. 17 sometimes preempts a valid entry at the head of the LRU list in step 272 only to destroy its identity and return its cache block to the head of the LRU list in step 278. This has the effect of reducing lock traffic at the expense of reducing the lifetime of valid entries in the cache. An alternative would be to add some initial steps of locking the parent hash list, and searching the parent hash list for an entry to reuse having the same parent handle and child name as the entry to be added, and if one is found, then continuing to step 291 of FIG. 18, and if one is not found, branching to step 271 of FIG. 17.

The procedure of FIGS. 17 and 18 sometimes finds a pre-existing entry with the same parent handle and child name and in most cases re-uses that entry by removing it from its parent and child hash lists (step 281) and putting it back on its parent and child hash lists. Actually is not necessary to remove it from its parent and child hash lists if its child handle matches the child handle for the new entry. This would be the case except when a file has been replaced by another with the same name. Therefore a step could be added after step 278 and before step 279 to check whether the child handle of the entry found in step 275 matches the child handle for the new entry, and if not, execution would continue to step 279, and if so, then the entry found in step 275 would be moved to the tail of the LRU list, and then the LRU list would be unlocked, and the parent bucket would be unlocked, and execution would return.

Figure 19:
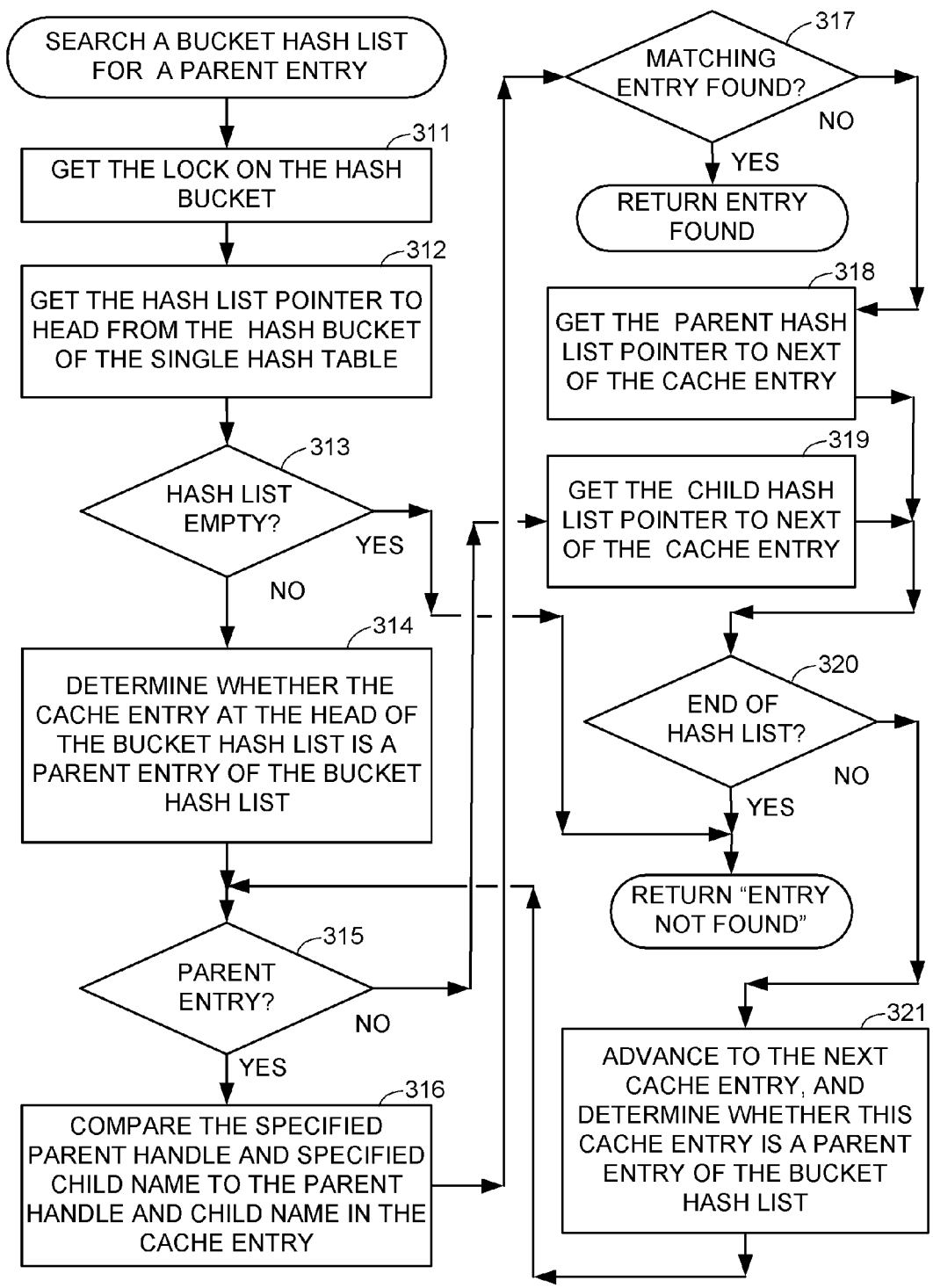
FIG. 19 is a flowchart of a procedure for searching a bucket hash list for a parent entry having a specified parent handle and a specified child name.

FIG. 19 shows a procedure for searching a bucket hash list for a parent entry having a specified parent handle and a specified child name. In a first step 311, the code thread gets the lock on the hash bucket. Then in step 312, the code thread gets the hash list pointer to head from the hash bucket of the single hash table (240 in FIG. 14). In step 313, if this hash list pointer to head is zero, then the bucket hash list is empty, and execution returns with a code indicating that the desired parent entry is not found on the bucket hash list. Otherwise, execution continues to step 314. In step 314, the code thread determines whether the cache entry at the head of the bucket hash list is a parent entry of the bucket hash list, and if not, a branch occurs in step 315.

In general, a given cache entry can be a parent entry on one bucket hash list and a child entry on another bucket hash list. Is also possible for a single cache entry to appear on the same bucket hash list once as a parent entry and another time as a child entry. Upon reaching a cache entry during a search of a bucket hash list, a determination of whether or not a cache entry is a parent entry on the bucket hash list can be based upon information about how the entry was reached during the search process. Depending on the specific implementation, it may be possible to decode information from a bucket hash list "pointer to next" to determine whether or not the cache entry found using this pointer is a parent entry for the bucket hash list.

For example, each link of the bucket hash list is marked to indicate whether or not each appearance of a cache entry in the bucket hash list is a parent entry or a child entry of the bucket hash list. For example, each cache entry includes a flag for indicating whether or not the parent hash list link is for a parent or child entry of the bucket hash list using the parent hash list link, and each cache entry includes a flag for indicating whether or not the child hash list link is for a parent or child entry of the bucket hash list using the child hash list link. If the fields for the hash list pointers are at least one bit larger than required for storing the largest hash list pointer value, then such a flag could be stored in the least significant bit position of the field for each hash list forward pointer (i.e., the hash list pointer to head, the parent hash list pointer to next, and the child hash list pointer to next). For example, the least significant bit position of the field for each hash list forward pointer is encoded to indicate whether or not the cache entry at the head of the bucket hash list or the next cache entry in the bucket hash list is a parent entry or a child entry on the bucket hash list. For example, when a cache entry is put on its parent hash list, the least significant bit of the forward hash list pointer to this appearance of the cache entry is cleared, and when a cache entry is put on its child hash list, the least significant bit of the forward hash list pointer to this appearance of the cache entry is set.

For example, in another specific implementation, each cache entry includes an additional parent hash list field for a pointer to the beginning address of the cache entry, and each cache entry includes an additional child hash list field for a pointer to the beginning address of the cache entry. To determine whether the next cache entry is a parent entry on the bucket hash list, the code thread adds a fixed offset to the bucket hash list forward pointer to the cache entry to compute an address for reading the parent or child hash list field containing a pointer to the beginning address of the cache entry. The pointer to the beginning address of the cache entry provides a base address for reading any selected field of the cache entry. In particular, the address of the parent hash list pointer to next field of the cache entry is computed by adding a fixed offset to the beginning address of the cache entry. The cache entry is a parent entry if the bucket hash list forward pointer to the cache entry is equal to the address of the parent hash list pointer to next field of the cache entry.

In step 315, if the cache entry is a parent entry, then execution continues to step 316 to compare the specified parent handle and specified child name to the parent handle and child name in the cache entry. In step 317, if there is a match of the parent handle and child name, then execution returns with the cache entry that has been found. Otherwise, execution continues to step 318 to get the parent hash list pointer to next of the cache entry. In a preferred implementation, if the cache entry is a parent entry on the bucket hash list, then the bucket hash list forward pointer to the cache entry is the address of the parent hash list pointer to next field of the cache entry, so that the parent hash list pointer to next of the cache entry is quickly fetched from memory using the bucket hash list forward pointer to the cache entry. (The bucket hash list forward pointer to the cache entry is obtained in step 312, or in step 318 or 319 when a loop back occurs.)

In step 315, if the cache entry is not a parent entry, then execution branches to step 319. In step 319, the code thread gets the child hash list pointer to next of the cache entry. In a preferred implementation, if the cache entry is a child entry on the bucket hash list, then the bucket hash list forward pointer to the cache entry is the address of the child hash list pointer to next field of the cache entry, so that the child hash list pointer to next of the cache entry is quickly fetched from memory using the bucket hash list forward pointer to the cache entry. (The bucket hash list forward pointer to the cache entry is obtained in step 312, or in step 318 or 319 when a loop back occurs.)

From step 318 or step 319, execution continues to step 320. In step 320, if the pointer to next indicates that the end of the bucket hash list has been reached, then execution returns with a code indicating that the desired entry is not on the bucket hash list. Otherwise, execution continues to step 321 to advance to the next cache entry, and to determine whether this cache entry is a parent entry of the bucket hash list. Execution loops back to step 315 to continue the search for the desired parent entry on the bucket hash list.

Figure 20:
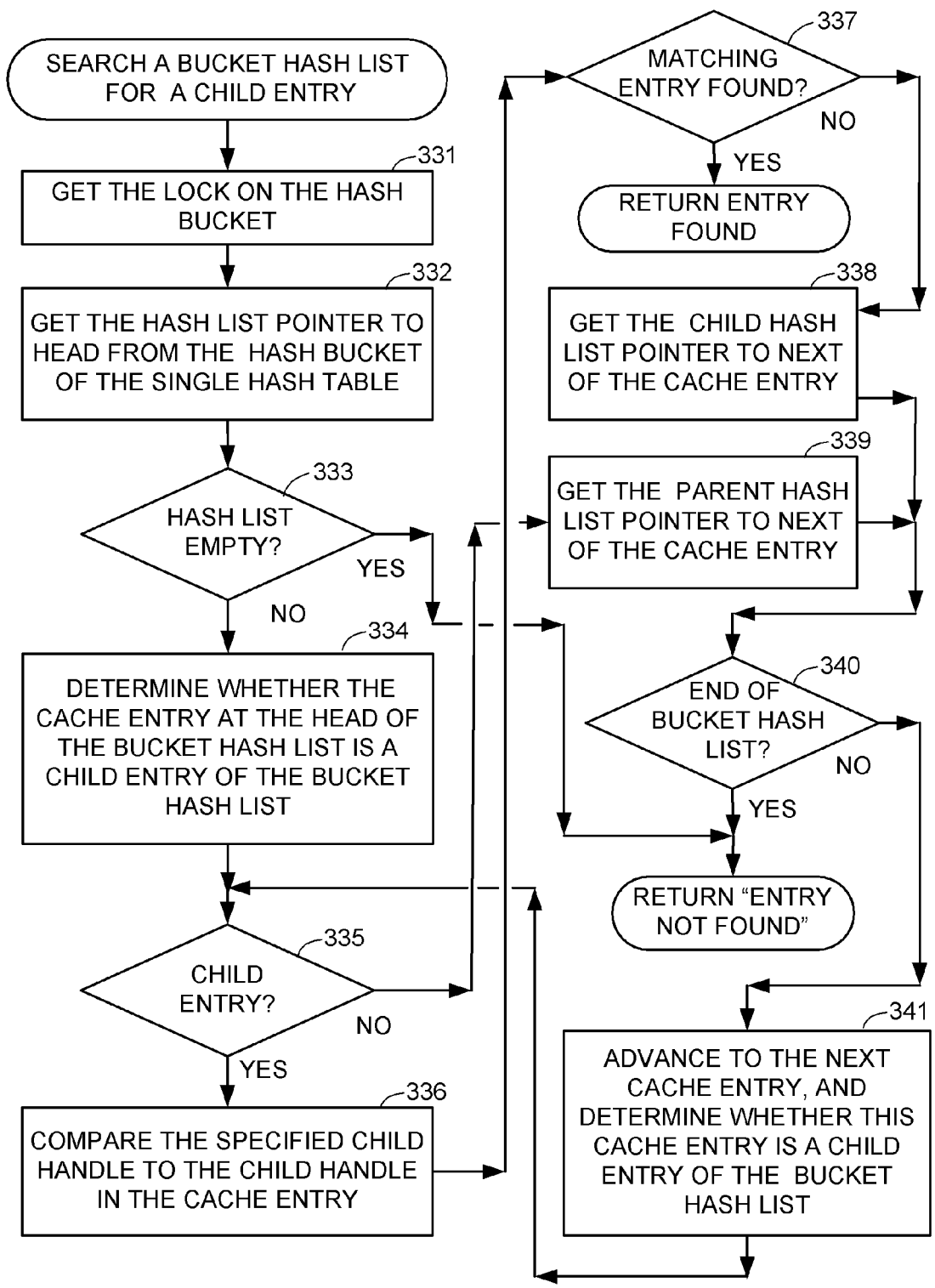
FIG. 20 is a flowchart of a procedure for searching a bucket hash list for a child entry having a specified child handle.

FIG. 20 shows a procedure for searching a bucket hash list for a child entry having a specified child handle. In a first step 331, the code thread gets the lock on the hash bucket. Then in step 332, the code thread gets the hash list pointer to head from the hash bucket of the single hash table (240 in FIG. 14). In step 333, if this hash list pointer to head is zero, then the bucket hash list is empty, and execution returns with a code indicating that the desired child entry is not found on the bucket hash list. Otherwise, execution continues to step 334. In step 334, the code thread determines whether the cache entry at the head of the bucket hash list is a child entry of the bucket hash list. If so, then execution continues to step 336 to compare the specified child handle to the child handle in the cache entry. In step 337, if there is a match of the child handle, then execution returns with the cache entry that has been found. Otherwise, execution continues to step 338 to get the child hash list pointer to next of the cache entry. This child hash list pointer to next is obtained from the same kind of link that was last used to access the cache entry.

In step 335, if the cache entry is not a child entry, then execution branches to step 339. In step 339, the code thread gets the parent hash list pointer to next of the cache entry. From step 338 or step 339, execution continues to step 340. In step 340, if the pointer to next indicates that the end of the bucket hash list has been reached, then execution returns with a code indicating that the desired entry is not on the bucket hash list. Otherwise, execution continues to step 341 to advance to the next cache entry, and to determine whether this cache entry is a child entry of the bucket hash list. Execution loops back to step 345 to continue the search for the desired child entry on the bucket hash list.

The "findParent" function described above with reference to FIGS. 12 and 13 finds the parent handle and child name for a specified child handle. Typically it is desired to find the full pathname of the directory or file in the file system, given the specified child handle. This can be done by iteratively invoking the "findParent" function to walk up the file system hierarchy until reaching the root directory handle.

Figure 21:
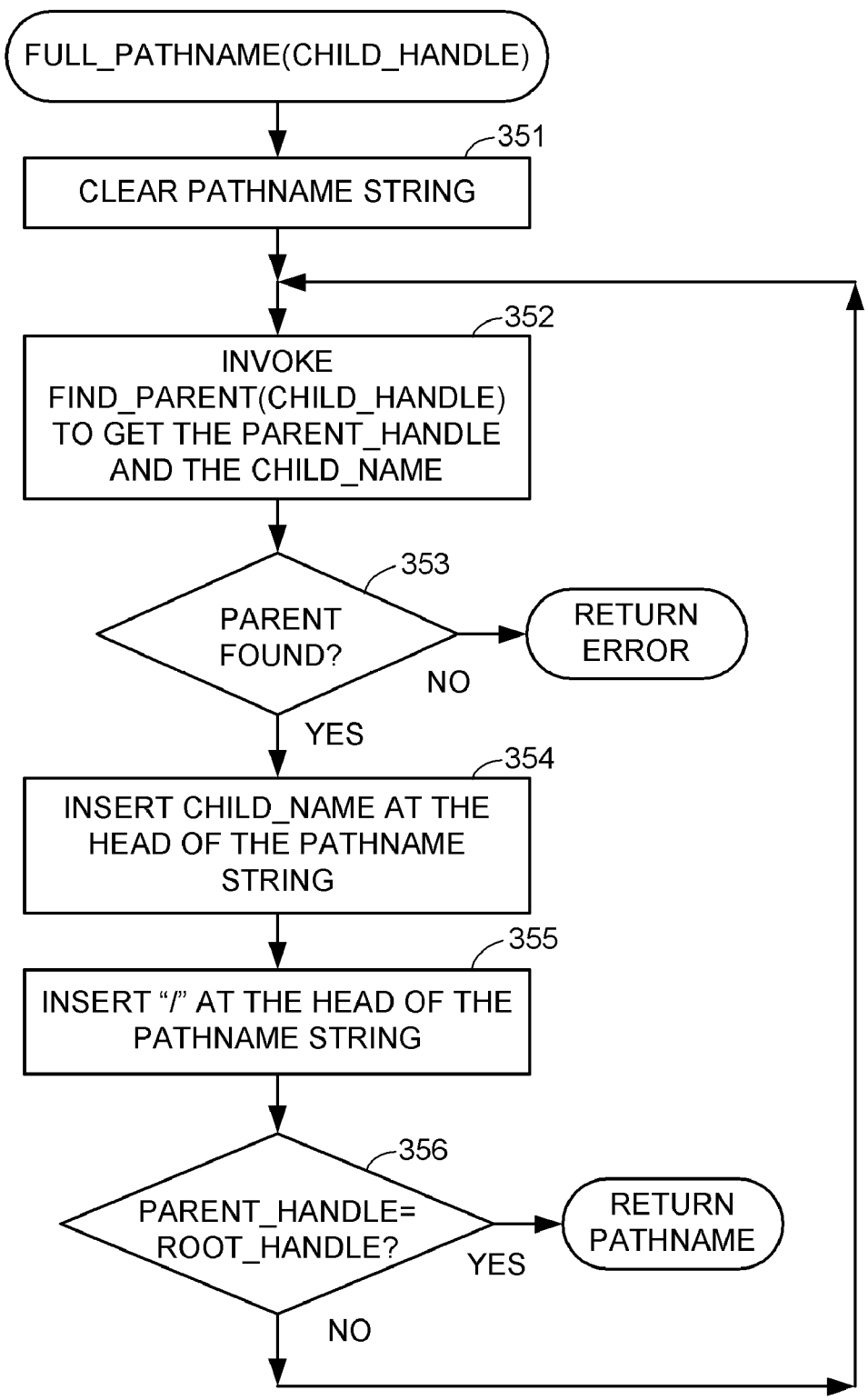
FIG. 21 is a flowchart of a procedure for iteratively invoking the "findParent" function of FIG. 12 to find the full pathname for a file having a specified file handle.

FIG. 21 shows a "fullPathname" function for finding the full pathname of a directory or file having a specified child handle. In a first step 351, a string for the pathname is cleared. In step 352, the "findParent" function is invoked to get the parent handle and the child name for the specified child handle. In step 353, if the parent is not found, then execution returns with an error. Otherwise, if the parent is found, execution continues to step 354. In step 354, the child name is inserted at the head of the pathname string. In step 355, a file name delimiter "/" is inserted at the head of the pathname string. In step 356, if the parent handle is equal to the root directory handle, then execution returns with the full pathname. Otherwise, if the parent handle is not equal to the root directory handle, then execution loops back from step 356 to step 352.

Figure 22:
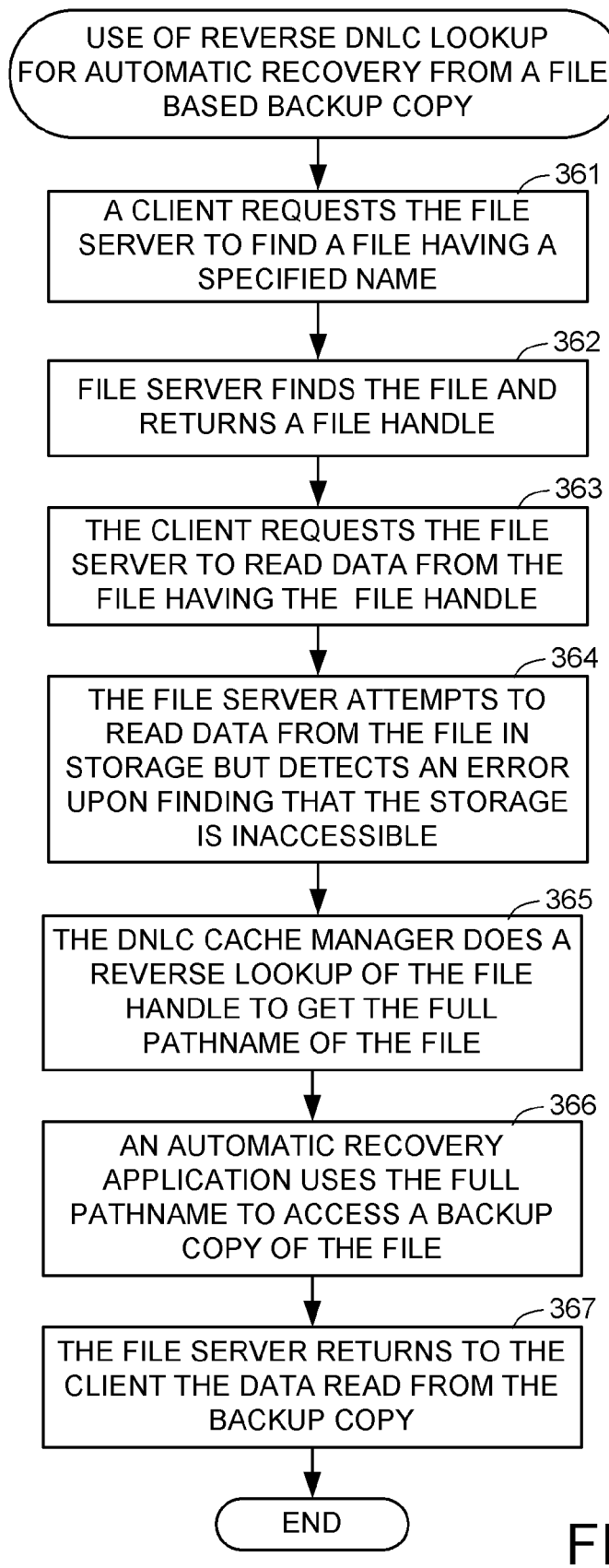
FIG. 22 is a flowchart of a procedure for using the reverse DNLC lookup for automatic recovery from a storage access error during reading or writing to a file by accessing a backup copy of the file.

FIG. 22 shows a use of the "fullPathname" function of FIG. 21 for automatic recovery from a file-based backup copy. In a first step 361, a client requests the file server to lookup a file having a specified name. In step 362, the file server finds the file and returns a file handle. In step 363, the client requests the file server to read data from the file having the file handle. In step 364, the file server attempts to read data from the file in storage but detects an error upon finding that the storage is inaccessible. In step 365, for recovery from the error, the DNLC cache manager (46 in FIG. 1) does a reverse lookup of the file handle to get the full pathname of the file. In step 366, an automatic recovery application (47 in FIG. 1) uses the full pathname to access a backup copy of the file (in the file system 49 in backup storage 48 in FIG. 1). In step 367, the file server returns to the client the data read from the backup copy.

Although the invention has been described with respect to specific embodiments shown in the figures, it should be understood that the invention could be practiced by adding child hash lists to a DNLC cache having different formats for the hash buckets and parent hash list entries, and different mechanisms for preemption and locking. For example, the invention could be practiced by adding child hash list pointers to the hash buckets and hash list entries in the DNLC cache described in the OpenSolaris DNLC source code cited above.

In view of the above, there has been described a directory name lookup cache (DNLC) providing a hashed forward mapping for finding the child handle associated with a specified parent handle and a specified child name, and also providing a hashed reverse mapping for finding the parent handle and child name associated with a specified child handle. To provide the hashed reverse mapping, a second set of links is added to each cache entry for a "child hash list" indexed by a hashing of the child handle. For dynamically enabling and disabling the reverse mapping, when a new cache entry is added to its parent hash list, if the reverse mapping is enabled, then the new cache entry is also added to its child hash list; otherwise, the new cache entry is marked to indicate that it is not in any child hash list. If the reverse mapping remains disabled for an extended duration of time, the child hash lists tend to become empty. Once the child hash lists become empty, the performance of the forward lookup is virtually the same as if the DNLC cache would not have the reverse lookup capability. To save memory, the parent hash lists and the child hash lists may share hash buckets. To avoid a deadlock that might be possible due to sharing of the locks on the hash buckets when acquiring concurrent locks on a parent hash bucket and on a child hash bucket, priority is given to one of the parent or child hash buckets based on a comparison of the hash index values of the parent and child hash buckets. Therefore, the efficient reverse lookup capability can be provided without substantially increasing the memory footprint of the DNLC and without imposing a significant execution time penalty when the hashed reverse mapping is disabled.

What is claimed is:

1. A method of operation of a data processing system including an electronic random access memory and at least one data processor coupled to the random access memory for writing data to and reading data from the random access memory, said method comprising:

storing cache entries in the random access memory, each of the cache entries including a parent handle, a child handle, and an alphanumeric child name, the parent handle being a handle of a directory in a file system, the child handle being a handle of a subdirectory or file in the directory, and the child name being a name of the subdirectory or file;

preempting cache entries that are not frequently accessed for storing new cache entries in the random access memory;

maintaining parent hash lists of the cache entries and searching the random access memory for a child handle associated with a specified parent handle and a specified child name by searching a parent hash list indexed by a hashing of the specified parent handle and the specified child name;

maintaining child hash lists of the cache entries and searching the random access memory for a parent handle and a child name associated with a specified child handle by searching a child hash list indexed by a hashing of the specified child handle; and inserting the new cache entries into the parent hash lists, and dynamically enabling and disabling insertion of the new cache entries into the child hash lists, so that when the insertion of the new cache entries into the child hash lists is enabled, new cache entries are inserted into the parent hash lists and are also inserted into the child hash lists, and when the insertion of the new cache entries into the child hash lists is disabled, new cache entries having child handles are inserted into the parent hash lists and are not inserted into any of the child hash lists.

2. The method as claimed in claim 1, which further includes marking as not being in any child hash list at least one new cache entry that has a child handle and is inserted into a parent hash list when insertion of the new cache entries into the child hash lists is disabled.

3. The method as claimed in claim 2, which includes marking said at least one new cache entry as not being in any child hash list by setting a child hash list pointer field in said at least one new cache entry to a value that is invalid for a child hash list pointer.

4. The method as claimed in claim 2, wherein the preempting of a not frequently accessed cache entry includes obtaining a lock on a parent hash list of the not frequently accessed cache entry, inspecting the not frequently accessed cache entry to determine that the not frequently accessed cache entry is not marked as not being in any child hash list, and upon determining that the not frequently accessed cache entry is not marked as not being in any child hash list, obtaining a lock on a child hash list of the not frequently accessed cache entry and removing the not frequently accessed cache entry from the child hash list of the not frequently accessed cache entry.

5. The method as claimed in claim 1, wherein the parent hash lists and the child hash lists share hash buckets and locks upon the hash buckets, and wherein the method further includes avoiding a deadlock when execution of a first code thread has obtained a lock upon one hash bucket for accessing a parent hash list anchored to said one hash bucket and the first code thread is seeking a lock upon another hash bucket for accessing a child hash list anchored to said another hash bucket, and execution of a second code thread has obtained the lock upon said another hash bucket for accessing a parent hash list anchored to said another hash bucket and the second code thread is seeking the lock upon said one hash bucket for accessing a child hash list anchored to said one hash bucket.

6. The method as claimed in claim 5, which includes avoiding the deadlock by giving priority to one of the code threads based on a comparison of a hash index value of said one hash bucket to a hash index value of said another hash bucket, and by relinquishing the lock obtained by the other one of the code threads.

7. A data processing system comprising: an electronic random access memory; and at least one data processor coupled to the random access memory for writing data to and reading data from the random access memory;

wherein said at least one data processor is programmed for storing cache entries in the random access memory, each of the cache entries including a parent handle, a child handle, and an alphanumeric child name, the parent handle being a handle of a directory in a file system, the child handle being a handle of a subdirectory or file in the directory, and the child name being a name of the subdirectory or file;

wherein said at least one data processor is programmed for preempting cache entries that are not frequently accessed for storing new cache entries in the random access memory;

wherein said at least one data processor is programmed for maintaining parent hash lists of the cache entries and searching the random access memory for a child handle associated with a specified parent handle and a specified child name by searching a parent hash list indexed by a hashing of the specified parent handle and the specified child name;

wherein said at least one data processor is programmed for maintaining child hash lists of the cache entries and searching the random access memory for a parent handle and a child name associated with a specified child handle by searching a child hash list indexed by a hashing of the specified child handle; and wherein said at least one data processor is programmed for inserting the new cache entries into the parent hash lists, and for dynamically enabling and disabling insertion of the new cache entries into the child hash lists so that when the insertion of the new cache entries into the child hash lists is enabled, new cache entries are inserted into the parent hash lists and are also inserted into the child hash lists, and when the insertion of the new cache entries into the child hash lists is disabled, new cache entries having child handles are inserted into the parent hash lists and are not inserted into any of the child hash lists.

8. The data processing system as claimed in claim 7, wherein said at least one data processor is further programmed for marking a new cache entry having a child handle as not being in any child hash list when the new cache entry is inserted into the parent hash list and insertion of the new cache entries into the child hash lists is disabled.

9. The data processing system as claimed in claim 8, wherein said at least one data processor is further programmed for marking the new cache entry as not being in any child hash list by setting a child hash list pointer field in the new cache entry to a value that is invalid for a child hash list pointer.

10. The data processing system as claimed in claim 8, wherein said at least one data processor is programmed for preempting a not frequently accessed cache entry by obtaining a lock on a parent hash list of the not frequently accessed cache entry, inspecting the not frequently accessed cache entry to determine whether the not frequently accessed cache entry is marked as not being in any child hash list, and if the not frequently accessed cache entry is marked as not being in any child hash list, then removing the not frequently accessed cache entry from the parent hash list of the not frequently accessed cache entry, and otherwise if the not frequently accessed cache entry is not marked as not being in any child hash list, then obtaining a lock on a child hash list of the not frequently accessed cache entry and removing the not frequently accessed cache entry from the child hash list of the not frequently accessed cache entry and removing the not frequently accessed cache entry from the parent hash list of the not frequently accessed cache entry.

11. The data processing system as claimed in claim 7, wherein said at least one data processor is programmed for maintaining a parent hash table of pointers to the parent hash lists and locks upon the parent hash lists and for indexing the parent hash table with the hashing of the specified parent handle and the specified child name when searching the cache for the child handle associated with the specified parent handle and the specified child name; and wherein said at least one data processor is programmed for maintaining a child hash table of pointers to the child hash lists and locks upon the child hash lists and for indexing the child hash table with the hashing of the specified child handle when searching the cache for the parent handle and child name associated with the specified child handle.

12. The data processing system as claimed in claim 7, wherein said at least one data processor is programmed for maintaining a hash table of pointers to the parent hash lists and the child hash lists and locks shared upon the parent hash lists the child hash lists, and for indexing the hash table with the hashing of the specified parent handle and the specified child name when searching the cache for the child handle associated with the specified parent handle and the specified child name, and for indexing the hash table with the hashing of the specified child handle when searching the cache for the parent handle and child name associated with the specified child handle.

13. The data processing system as claimed in claim 12, wherein said at least one data processor is programmed for avoiding a deadlock when execution of a first code thread has obtained a lock of one row of the hash table for accessing a parent hash list anchored in said one row of the hash table and the first code thread is seeking a lock of another row of the hash table for accessing a child hash list anchored in said another row of the hash table, and execution of a second code thread has obtained the lock of said another row of the hash table for accessing a parent hash list anchored in said another row of the hash table and the second code thread is seeking the lock of said one row of the hash table for accessing a child hash list anchored in said one row of the hash table.

14. The data processing system as claimed in claim 13, wherein said at least one data processor is further programmed for avoiding the deadlock by giving priority to one of the code threads based on a comparison of a hash table index of said one row of the hash table to a hash table index of said another row of the hash table, and relinquishing the lock obtained by the other one of the code threads.

15. A file server comprising, in combination: data storage for storing a file system; electronic random access memory; and at least one data processor coupled to the data storage for providing a client with access to the file system, and coupled to the random access memory for writing data to and reading data from the random access memory;

wherein said at least one data processor is programmed for storing cache entries in the random access memory, each of the cache entries including a parent handle, a child handle, and an alphanumeric child name, the parent handle being a handle of a directory in the file system, the child handle being a handle of a subdirectory or file in the directory, and the child name being a name of the subdirectory or file;

wherein said at least one data processor is programmed for preempting cache entries that are not frequently accessed for storing new cache entries in the random access memory;

wherein said at least one data processor is programmed for maintaining parent hash lists of the cache entries and searching the random access memory for a child handle associated with a specified parent handle and a specified child name by searching a parent hash list indexed by a hashing of the specified parent handle and the specified child name;

wherein said at least one data processor is programmed for maintaining child hash lists of the cache entries and searching the random access memory for a parent handle and a child name associated with a specified child handle by searching a child hash list indexed by a hashing of the specified child handle;

wherein said at least one data processor is programmed for responding to a request from the client for finding a file having a specified name in the file system by performing a forward lookup in the random access memory for a file handle of the file having the specified name and returning the file handle to the client;

wherein said at least one data processor is programmed for responding to a request from the client for reading data from a file having a specified file handle by detecting an error upon finding that the file having the specified file handle is inaccessible from the data storage;

wherein said at least one data processor is programmed for performing a reverse lookup in the random access memory to determine a pathname in the file system for the file having the specified file handle for recovery from the error; and wherein said at least one data processor is programmed for inserting the new cache entries into the parent hash lists, and for dynamically enabling and disabling insertion of the new cache entries into the child hash lists, so that when the insertion of the new cache entries into the child hash lists is enabled, new cache entries are inserted into the parent hash lists and are also inserted into the child hash lists, and when the insertion of the new cache entries into the child hash lists is disabled, new cache entries having child handles are inserted into the parent hash lists and are not inserted into any of the child hash lists.

16. The file server as claimed in claim 15, wherein said at least one data processor is further programmed for marking a new cache entry having a child handle as not being in any child hash list when the new cache entry is inserted into a parent hash list and insertion of the new cache entries into the child hash lists is disabled.

17. The file server as claimed in claim 15, wherein the parent hash lists and the child hash lists share hash buckets and locks upon the hash buckets, and wherein said at least one data processor is programmed for avoiding a deadlock when execution of a first code thread has obtained a lock upon one hash bucket for accessing a parent hash list anchored to said one hash bucket and the first code thread is seeking a lock upon another hash bucket for accessing a child hash list anchored to said another hash bucket, and execution of a second code thread has obtained the lock upon said another hash bucket for accessing a parent hash list anchored to said another hash bucket and the second code thread is seeking the lock upon said one hash bucket for accessing a child hash list anchored to said one hash bucket.

* * * * *